United States Patent [19]

Combs

[11] Patent Number: 5,765,197

[45] Date of Patent: Jun. 9, 1998

[54] METHOD AND SYSTEM FOR AUTHENTICATION OF A MEMORY UNIT FOR A COMPUTER SYSTEM

[75] Inventor: James Lee Combs, Lexington, Ky.

[73] Assignee: International Business Machines Corporation, Armonk, N.Y.

[21] Appl. No.: 581,859

[22] Filed: Jan. 2, 1996

Related U.S. Application Data

[63] Continuation of Ser. No. 168,675, Dec. 16, 1993, Pat. No. 5,666,516.

[51] Int. Cl.⁶ .................. G06F 12/00; G06F 12/14; H04L 9/00

[52] U.S. Cl. .................. 711/164; 364/DIG. 1; 364/DIG. 2; 380/4; 380/14; 380/20; 380/42; 711/100; 711/163; 395/186

[58] Field of Search .................. 364/DIG. 1, DIG. 2; 380/4, 14, 20, 42; 395/186, 490, 427; 711/100, 163, 164

[56] References Cited

U.S. PATENT DOCUMENTS

| | | | |
|---|---|---|---|
| 4,168,396 | 9/1979 | Best | 380/4 |
| 4,278,837 | 7/1981 | Best | 380/4 |
| 4,432,067 | 2/1984 | Nielsen | 463/44 |
| 4,583,196 | 4/1986 | Koo | 395/186 |
| 4,680,731 | 7/1987 | Izumi et al. | 365/52 |
| 4,685,056 | 8/1987 | Barnsdale, Jr. et al. | 395/491 |
| 4,910,772 | 3/1990 | Matias et al. | 380/20 |
| 5,081,675 | 1/1992 | Kittirutsunetorn | 380/4 |
| 5,155,829 | 10/1992 | Koo | 395/490 |
| 5,392,404 | 2/1995 | Thompson | 395/275 |
| 5,438,666 | 8/1995 | Craft et al. | 395/842 |
| 5,442,341 | 8/1995 | Lambropoulos | 390/825.31 |
| 5,446,864 | 8/1995 | Burghardt et al. | 395/427 |

*Primary Examiner*—Tod R. Swann
*Assistant Examiner*—Tuan V. Thai
*Attorney, Agent, or Firm*—Calfee, Halter & Griswold; Daniel E. McConnell

[57] ABSTRACT

A computer system for high-performance video and audio manipulations comprising a locked memory cartridge and an audio/video/compact disk (CD) drive controller/coprocessor. The computer system has a central processing unit (CPU) with at least one bus associated therewith, with the bus having at least one bus line. The cartridge comprises a readable memory, a memory control circuit, a lock control circuit, and a connector all in circuit communication with each other. The connector allows the memory, the memory control circuit, and the lock control circuit to be pluggably connected in circuit communication with the CPU. The memory control circuit scrambles some of the bus lines, thereby scrambling the data in the memory on reset, and unscrambles the bus lines responsive to inputs from the lock control circuit. The lock control circuit monitors the bus, waiting for a proper combination of bus values to be asserted onto the bus, at which time the lock control circuit causes the memory control circuit to unscramble the bus lines. The audio/video/CD drive controller/coprocessor comprises a CPU interface, a CPU cache, a memory controller, a memory bus arbitrator, a DRAM refresher, a video controller, a CD drive controller, a digital signal processor (DSP) sound coprocessor, and a "blitter" graphics coprocessor in an integrated package.

17 Claims, 8 Drawing Sheets

METHOD AND SYSTEM FOR AUTHENTICATION OF A MEMORY UNIT FOR A COMPUTER SYSTEM

This application is a continuation of application Ser. No. 168,675 filed 16 Dec. 1993 and entitled "Protected Programmable Memory Cartridge and Computer System Using Same", now U.S. Pat. No. 5,666,516.

FIELD OF THE INVENTION

The present invention relates generally to computer system architecture and, more specifically, to a computer system having a removable programmable memory cartridge with an address-scrambling protection circuit to prevent unauthorized cartridges from being used in the computer system and to prevent use of the cartridge in unauthorized systems.

BACKGROUND OF THE INVENTION

Video graphics computer systems are well known, popular consumer products. A typical system includes a data processing unit that connects to an ordinary television set for displaying images of a game or other application. The data processing unit receives controlling software from a read only memory (ROM) that is usually packaged in the form of a cartridge. The cartridge is removably plugged into the data processing unit. At least one pointing device, such as a mouse, joystick, touchpad, switch pad, or light gun, is also connected to the data processing unit to allow the player to input positional information that is used by the controlling software to execute the application.

The data processing unit typically has a single central processing unit (CPU) and associated volatile and non-volatile memory, including all random access memory (RAM) and bootstrap read-only memory (boot ROM), a television (RF video) signal generator, and an input/output (I/O) processor to interface to the various pointing devices. These devices are in circuit communication. One distinguishing characteristic of these systems is the use of a motherboard or system planar to electrically connect these components together.

In such computer systems, the components communicate via electrical signals; therefore, many components must be in electrical circuit communication to allow the signals to pass from component to component. These electrical signals are typically carried by electrical connections between the system components. Typical types of electrical connections include metal traces on a printed circuit board (PCB), vias between different levels of multilayer PCBs, plated through holes, plugs, and individual wires connected from pin to pin of system components. Typically groups of electrical signals and groups of electrical connections that carry the electrical signals are referred to as a "bus." Thus, a reference to a "bus" can indicate a reference to a group of electrical signals, a group of electrical connections that carry the electrical signals, or a reference to both a group of electrical signals and a group of electrical connections that carry the electrical signals.

Buses are typically made up of "bus lines." A reference to an individual "bus line" may refer to an electrical connection of a bus or an electrical signal of a bus. The memory in computer systems is broken up into small sections called "bytes." Each byte in memory has a unique "address," similar to the unique addresses of personal residences. The information stored in memory is called "data." A computer system typically has three buses: an ADDRESS bus, a DATA bus, and a CONTROL bus. When a computer reads a piece of information from a particular address in memory, the CPU asserts the address of that particular point in memory onto the ADDRESS bus, then the CPU communicates to the memory chip to that the CPU desires to access the information stored in that address using the CONTROL bus. Then the memory chip asserts the information stored at that location onto the DATA bus. Finally, the CPU reads the data from the DATA bus. The above process is very fast, occurring at up to millions of times per second.

In typical cartridge-based systems, the ADDRESS bus, the DATA bus, and the CONTROL bus are extended out of the data processing unit through the connector to the electrical devices within the cartridge. Thus, while the cartridge is connected to the data processing unit, the program ROM in the cartridge is as much in electrical circuit communication with the CPU as is the bootstrap ROM and the system RAM within the data processing unit.

The commercial success of such systems motivates other, nonmanufacturing parties to design and manufacture competing cartridges and competing data processing units. The unauthorized cartridges are capable of executing in authorized data processing units; likewise, the unauthorized data processing units are capable of executing the programs contained within authorized cartridges. Such competing devices are not always "fully compatible" with authentic devices; therefore, unauthorized devices might malfunction. Moreover, incompatibilities in such unauthorized devices might cause the authorized devices to malfunction, thereby tarnishing the image of entities that manufacture authorized cartridges and authorized data processing units.

Moreover, authentic devices are typically designed and marketed to execute programs that are somewhat sophisticated in design and polished in execution. Allowing others to market programs or data processing units lacking similar sophistication and quality further tarnishes the image of entities manufacturing authorized cartridges and authorized data processing units. Thus, in cartridge-based computer systems it is desirable to prevent two types of unauthorized use: (1) the use of an unauthorized cartridge in an authorized processor unit and (2) the use of an authorized cartridge in an unauthorized processor unit. Thus, it is desirable to have the capability of authenticating a cartridge for use in a data processing unit and preventing unauthorized use of cartridges. Typical prior art devices do not provide a cost-effective, satisfactory solution to the problem.

An example of one such prior art system is found in U.S. Pat. No. 4,799,635 issued to Nakagawa on Jan. 24, 1989, which is directed to an authentication technique for a cartridge-based game unit. Software-controlled microprocessors exist in each of the data processing unit and the cartridge for executing related algorithms whose results are then compared. When a cartridge is inserted into the data processing unit, a satisfactory comparison must be made before the game unit will accept and operate with the cartridge. This approach is rather complicated and adds to the cost of manufacturing the cartridge, because a microcontroller must be added to the cartridge design.

Therefore it is desirable to provide a simpler security circuit for a ROM cartridge that causes a host data processing unit to only accept authentic cartridges and that prevents use of an authentic cartridge in unauthorized systems.

In addition, typical prior art systems have a single system bus for passing data among the various components. Having only one system bus reduces system performance because all I/O devices depend on the CPU for memory accesses.

Moreover, typical systems do not provide an integrated solution to handling high-performance video, graphics, and sound problems.

SUMMARY OF THE INVENTION

According to the present invention, a program cartridge is provided with an address scrambler and lock control circuit interposed between the CPU and the program ROM within the cartridge. When the system is powered up, the address scrambler "locks" the cartridge, preventing data from being accessed. The data processing unit "unlocks" the program cartridge by communicating a "combination" to the lock control circuit, which causes the address scrambler to "unlock" the program cartridge.

The address scrambler locks the cartridge by scrambling the address lines of the ADDRESS bus between the CPU and the ROM in the cartridge. When the address lines are scrambled, the CPU can still access the memory locations in the RON; however, the data in memory will appear to be in the wrong address in memory. Therefore, the CPU cannot execute programs from the ROM in the cartridge while the address scrambler is scrambling the address lines. Thus, the cartridge is "locked."

To "unlock" the cartridge, the CPU asserts a predetermined sequence of addresses onto the ADDRESS bus. The assertions are merely memory-to-register operations because the program ROM is scrambled, thereby preventing actual execution of the code in the program ROM. Any attempt to execute code within the ROM will cause a system crash because typical instructions are multi-byte instructions and scrambling the order of bytes causes the instructions to be executed incorrectly.

The sequence of addresses acts as the "combination" to unlock the cartridge. The lock control circuit monitors the ADDRESS bus, waiting for the correct "combination" to be written to the ADDRESS bus by the CPU. Once the lock control circuit detects the correct sequence of addresses, the lock control circuit causes the address scrambler to stop scrambling the address lines between the ROM and the CPU. With the address lines no longer scrambled, the CPU may execute programs from the ROM in the cartridge. The cartridge is "unlocked."

Adding the address scrambler and the lock control circuit to the cartridge adds little or no cost to the cartridge. In addition to the ROM, typical prior art cartridges have a programmable logic chip inside called an "address decoder," which is very well known in the art. Typical programmable logic chips have enough capacity to implement the address decoder as well as the address scrambler and lock control circuit of the present invention. Thus, the present invention may be added to cartridges without adding any additional chips, thereby adding the functions at little or no additional cost.

It is therefore an advantage of the present invention to provide a very cost-effective way of preventing unauthorized uses of the cartridges and data processing units.

In addition to the locked cartridge, the present invention also makes use of a massive custom chip to perform many tasks necessary to implement a high-speed, high-resolution audio/video system. This chip includes an interface to the CPU, a CPU "cache," a memory controller, a memory arbitrator, a DRAM refresher, a video controller, a compact disk (CD) drive controller, a digital signal processor (DSP) sound coprocessor, and a "blitter" graphics coprocessor. With the use of this "audio/video/CD controller/ coprocessor" (A/V/CD controller/coprocessor), a very high-speed, high resolution system becomes very cost-effective. The entire data processing system includes a CPU, the A/V/CD controller/coprocessor, memory, a TV signal generation circuit, an I/O processor, two decoder programmable array logic devices (decode PALs), two cartridge connectors, and an expansion connector.

The A/V/CD controller/coprocessor generates a second system bus (SYSTEM' bus) from the SYSTEM bus generated by the CPU. The system memory (including video RAM, system RAM, and boot ROM) is interfaced via the SYSTEM' bus. The cartridge ROM is interfaced via the SYSTEM bus; moreover, the processor "cache" is interfaced via the SYSTEM bus. Thus the CPU can access the cartridge ROM and the "cache" while the A/V/CD controller/ coprocessor performs functions with the system memory, thereby allowing parallel operation of the CPU and the A/V/CD controller/coprocessor.

Thus, it is a further advantage of this invention to provide a several-chip solution to designing a high-speed, high-resolution computer system.

These and other advantages of the present invention shall become more apparent from a detailed description of the invention.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below serve to example the principles of this invention.

DETAILED DESCRIPTION OF THE PREFERRED EMBODIMENT

Figures 1, 1A:
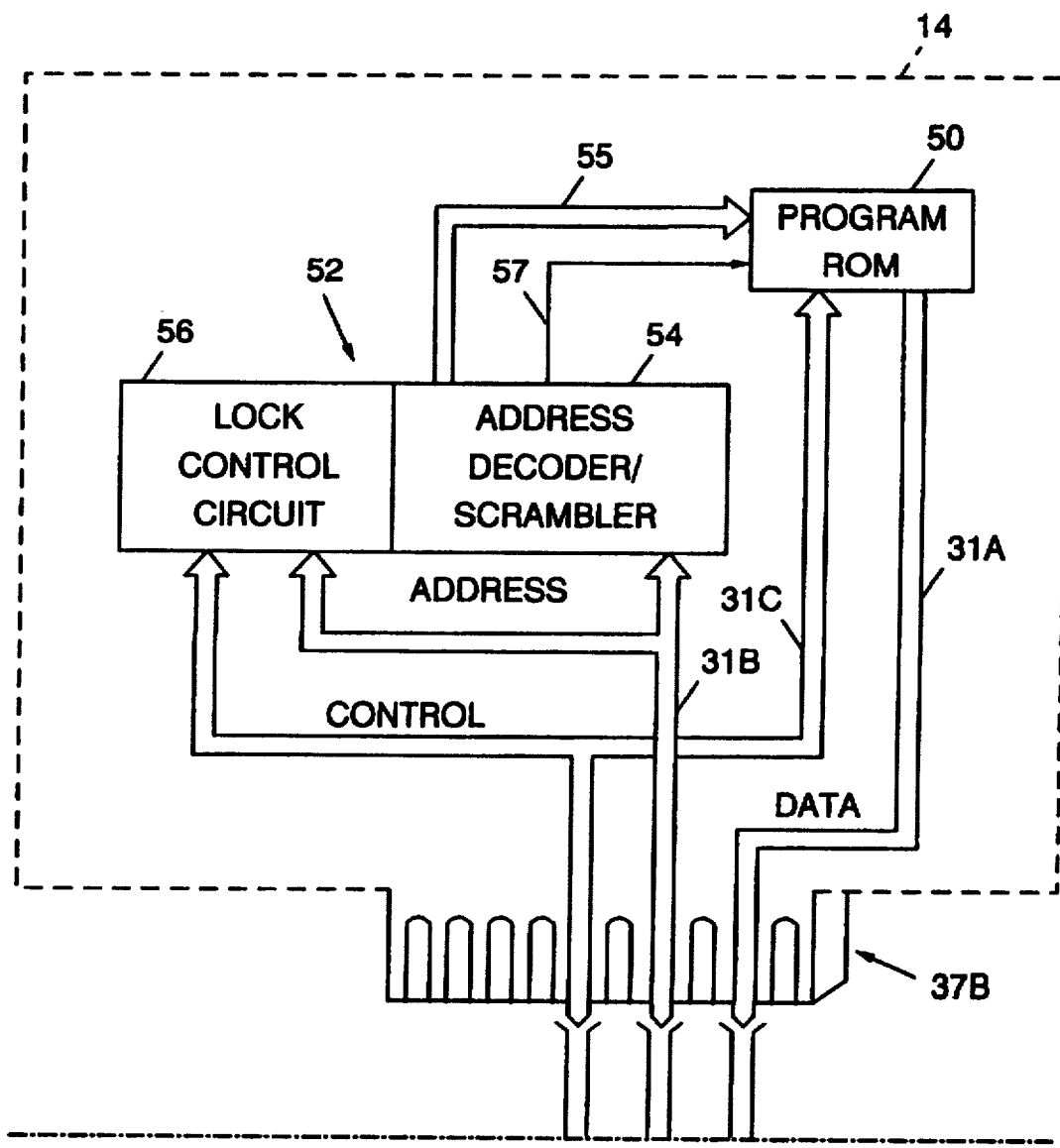
FIGS. 1A and 1B are block diagrams showing the general layout of the system of the present invention.
Figures 1, 1A, 2:
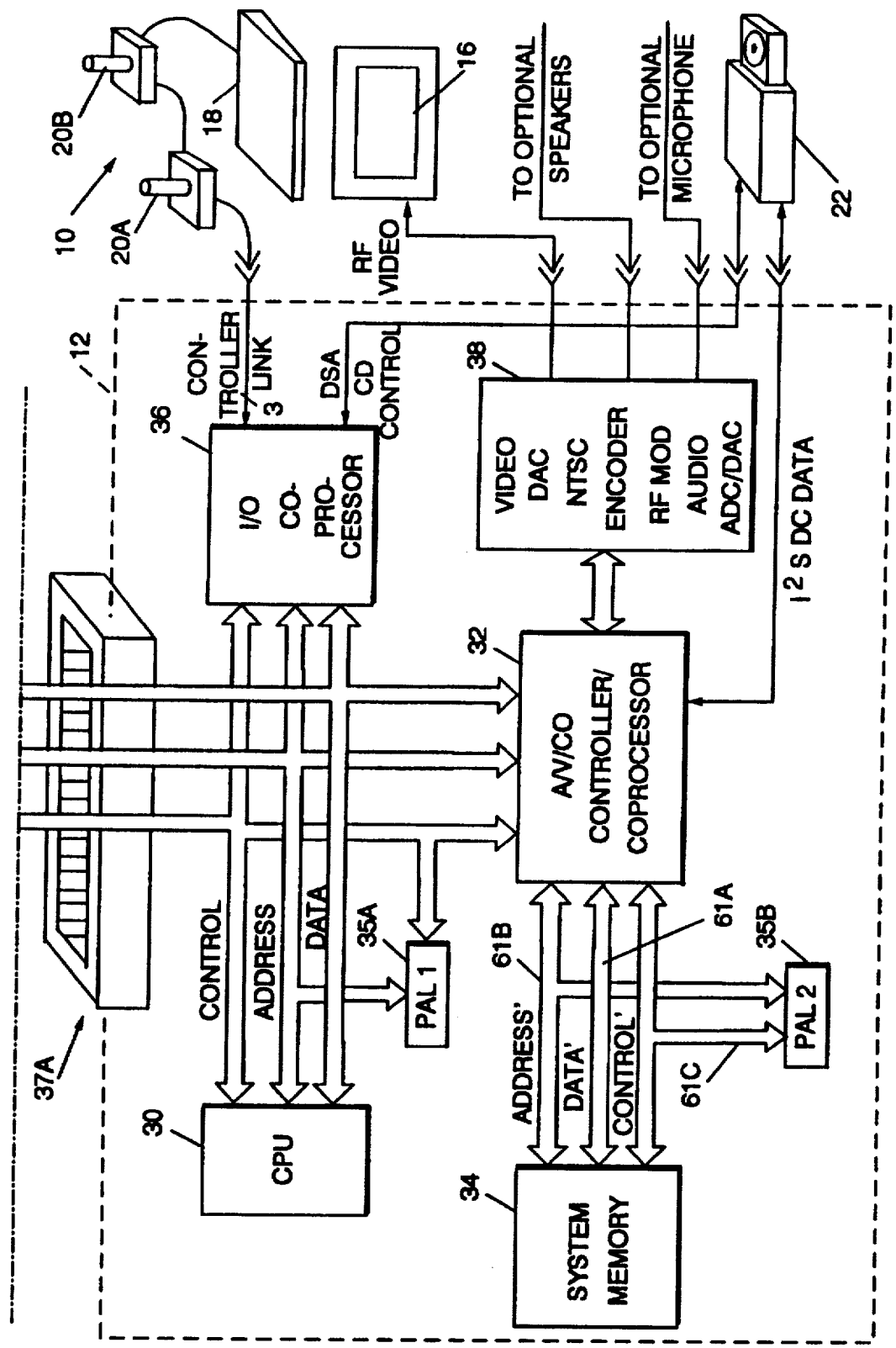
FIG. 2 is an electrical schematic representation of a portion of the video digital-to-analog converter used in the present invention.
Figure 1B:
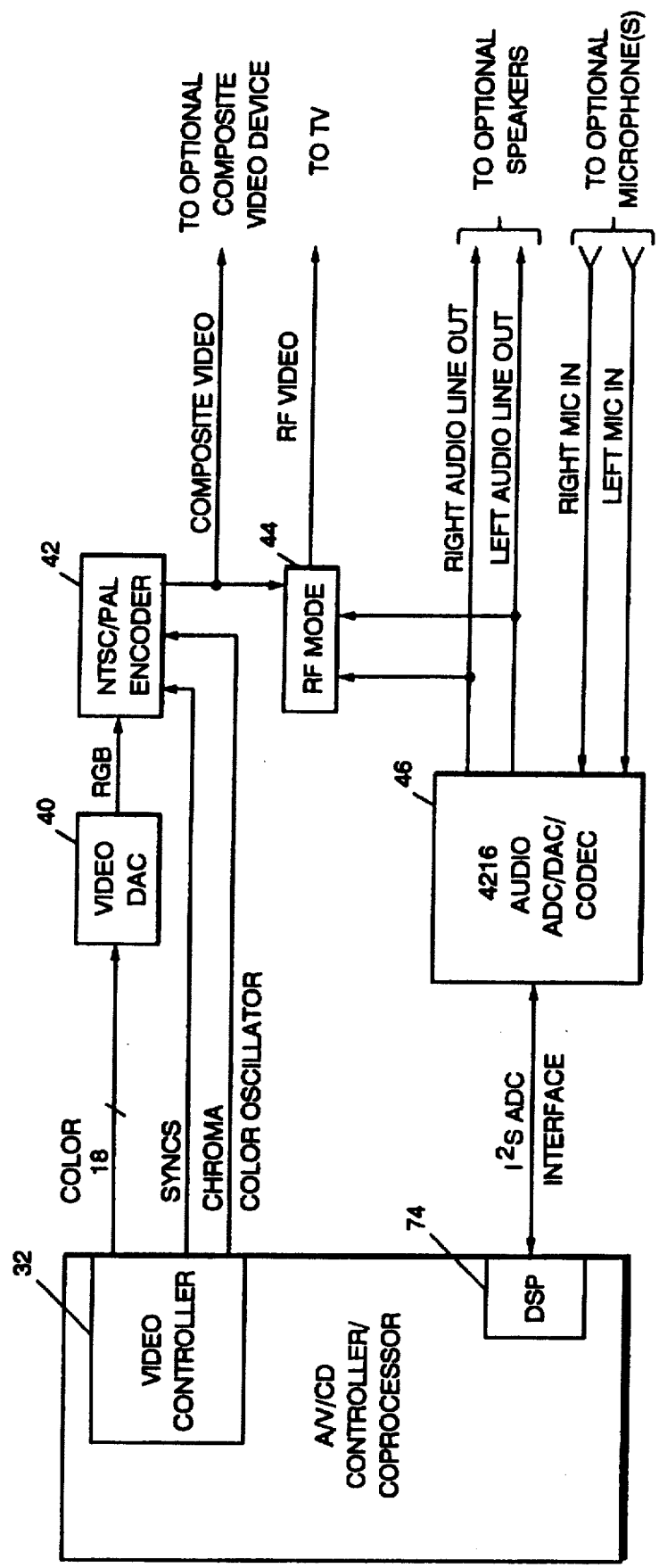
Figure 2:
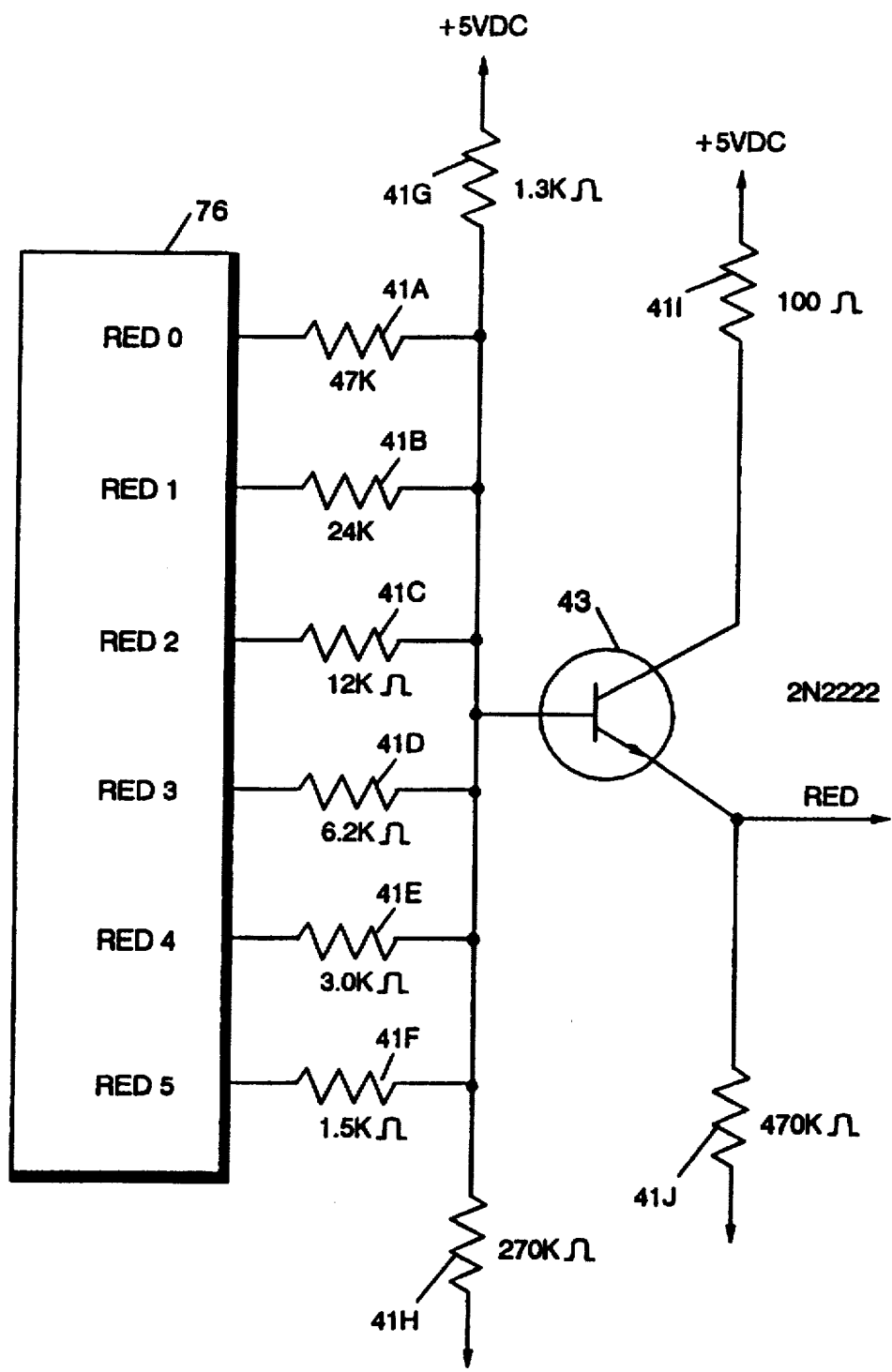

Referring to FIGS. 1A and 1B, a computer system 10 of the present invention is shown. As shown in FIG. 1A, the system 10 comprises a data processing unit 12 with a program cartridge 14 removably connected thereto. Also connected to the data processing unit 12 is a standard television set (TV) 16, an optional keyboard 18, one or more optional controllers 20a and 20b, and an optional CD drive 22. Although not shown in FIG. 1A, the standard TV 16 may be replaced with a pair of speakers and a display device that accepts a composite video signal.

Figure 4:
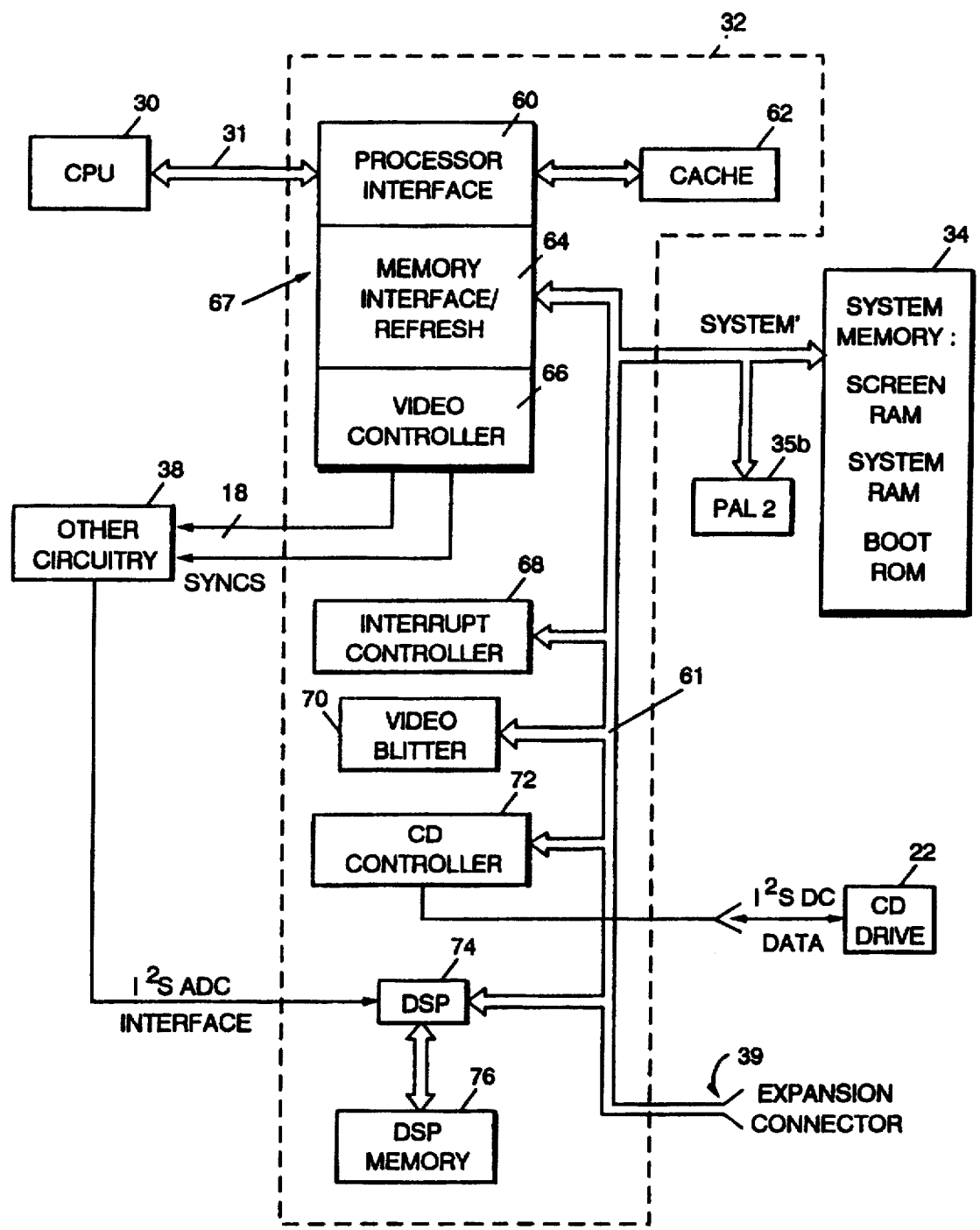
FIG. 4 is a block diagram showing the audio/video/CD controller/coprocessor of the present invention.

The processing unit 12 comprises a central processing unit (CPU) 30, an audio/video/CD drive (A/V/CD) controller/coprocessor 32, a system memory 34, a first decode chip PAL1 35a, a second decode chip PAL2 35b (also shown in FIG. 4), an I/O processor 36, two cartridge connectors (one indicated generally at 37a, the other not shown), additional circuitry 38 required to generate the audio and video signals, and an expansion connector (indicated generally at 39 in FIG. 4). These devices are connected in circuit communication as shown in FIG. 1A. The additional circuitry 38 is shown in FIG. 1B and discussed in more detail in the text accompanying FIG. 1B.

The CPU 30 generates multiple buses: a DATA bus 31a, an ADDRESS bus 31b, and a CONTROL bus 31c, as are well known in the art. These three buses are collectively referred to as the SYSTEM bus 31. In the preferred embodiment, the CPU 30 is an 80376, manufactured by Intel Corp., 3065 Bowers Ave., Santa Clara, Calif., 95051. The 80376 is a variation of the well known 80386SX, which is well known in the art and also available from Intel Corp. The 80376 differs from the 80386SX in that the 80376 starts up in 32-bit mode, rather than 16-bit mode. Specifically, the CR0 register is forced to a 0011H (0011 in hexadecimal notation) state with bit 0 forced to a logical ONE, effectively making the 376 operate in a 32-bit memory mode. Paging is enabled to allow virtual 386 operation.

The A/V/CD controller/coprocessor 32 will be discussed in detail in the text accompanying FIG. 4. Suffice it to say for now that the A/V/CD controller/coprocessor 32 comprises the following functional blocks: a memory refresher, a video controller, a blitter graphical coprocessor, a CD drive controller, a digital signal processor (DSP) sound coprocessor, and an arbitrator to arbitrate the access to the system memory between the six possible bus masters (the CPU, the blitter, the DSP, the memory refresher, the video controller, and the CD drive controller). The arbitrator controls the changing priorities of the devices, as described herein, and is in electrical circuit communication with all the devices within the A/V/CD controller/coprocessor 32. For example, the CPU 30 has the lowest priority of all bus masters until an interrupt occurs. Thus, the arbitrator is in circuit communication with both the CPU interface 60 and the interrupt controller 68.

The CPU 30 has a SYSTEM bus 31 associated with it. The SYSTEM bus 31 refers to the combined DATA bus 31a, ADDRESS bus 31b, and CONTROL bus 31c, shown in FIG. 1. The A/V/CD controller/coprocessor 32 is the arbitrator for the system memory 34; therefore, the SYSTEM bus 31 is modified to a SYSTEM' bus 61 (comprising the DATA' bus 61a, the ADDRESS' bus 61b, and the CONTROL' bus 61c) by the A/V/CD controller/coprocessor 32.

The system memory 34 comprises screen RAM, system RAM, and bootstrap ROM. The system memory 34 will be discussed in more detail in the text accompanying FIG. 4.

The I/O processor 36 interfaces the CPU 30 to numerous I/O devices, such as the keyboard 18, the controllers 20a and 20b, a digitizer (not shown), a mouse (not shown), a printer (not shown), and a touchpad (not shown). In the preferred embodiment, the I/O processor 36 is a preprogrammed MC68HC705C8 (hereinafter "68HC705"), manufactured by Motorola Corp, running at 2 MHz. The 68HC705 I/O processor 36 is interfaced to the CPU 30 by configuring the 68HC705 as a peripheral device: (1) PA0–PA7 are connected to D0–D7 of the DATA bus 31a; (2) PB7, PB1, and PB2 are connected GPIO1 (a 32-byte address range decoded by the A/V/CD controller/coprocessor 32, as described below), A1, and A2, respectively, of the ADDRESS bus 31b and CONTROL bus 31c; and (3) PB3, PB4, and PB5 are connected to ADS, READY, and W/R, respectively, of the CONTROL bus 31c. Thus, the I/O processor is decoded to have four 16-bit addresses in I/O space (referred to herein as AS0, AS2, AS4, and AS6).

The program inside the 68HC705 interfaces to the CPU 30 as follows. The 68HC705 is designed to attach directly to the processor bus and act as an I/O port to the CPU 30. A pair of internal latches holds data passing between each of the processors until the other is ready to receive it. Status bits to each processor indicate the condition of the data latches. Each can tell if the previous data has been read and if any new data is waiting to be read by checking the status bits.

The I/O coprocessor 36 implements the following functions: (1) a 50 ms timer, (2) a serial controller link for the input devices, (3) a cartridge sense, (4) a system reset, and (5) a data/strobe/acknowledge (DSA) CD control communications link for the CD drive 22.

The 50 ms timer is implemented using the watchdog timer of the 68HC705 I/O coprocessor 36. When the watchdog timer expires, the I/O coprocessor 36 interrupts the CPU 30 using analog interrupt 1 (AI1) of the A/V/CD controller/coprocessor 32. The CPU 30 responds to this by reading the 16-bit I/O port AS0, describes above, which causes the A/V/CD controller/coprocessor 32 to activate the I/O coprocessor 36, thereby causing a data transfer between the CPU 30 and the I/O coprocessor 36.

The controllers 20, the keyboard 18, and all other input devices are connected to the I/O processor 36 via the serial controller link. The controllers transform the movements of the control devices into a format suitable for transmission along the serial link. The controllers send data packets via the controller serial data link to the system unit. The data packets differ depending on the type of IO device. Co-ordinate type devices (mouse, analog joystick, touchpad, etc) have a different data packet then a switch closure type of device (keyboard, digital joystick, switch pad, etc).

The serial controller link consists of three (3) lines: a data receive line, a VCC (+5 VDC) line, and a ground line. The 68HC705 implements the data receive line of the controller serial link using the PDO/RDI pin. This pin is designed to be used as an interface to serial devices using the well known asynchronous format. A clocked synchronous format could be used in the alternative. The serial controller link is connected to external devices by a three conductor connector. Input devices are daisy chained, thus a single device physically connects to the data processing unit 12.

The cartridge sense is implemented by having the I/O coprocessor 36 poll a pin of the cartridge connector 37a. The pin is pulled to a logical ONE by a pullup resistor on the system planar and a properly connected cartridge pulls the pin to a logical ZERO.

The reset is implemented by giving the I/O coprocessor 36 control over the reset signals of the CPU 30 and the A/V/CD controller/coprocessor 32. The CPU 30 can command the I/O coprocessor 36 to reset the system 10. In addition, the I/O coprocessor 36 monitors the reset switch (not shown) for the system and resets the system when it detects a switch closure.

The DSA CD control communication protocol is implemented using three pins of the 68HC705. The I/O coprocessor 36 uses this protocol to communicate commands to the CD drive 22 and to relay messages from the CD drive 22 to the CPU 30.

The first decode chip PALL 35a is in electrical circuit communication with the CPU 30, the A/V/CD controller/coprocessor 32, and the two cartridge connectors 37a (the other not shown) along the ADDRESS bus 31b and CONTROL bus 31c, as shown in FIG. 1a. The first decode chip PAL1 35a accepts as inputs the upper two address lines, decodes the 16 megabyte address space of the 80376 CPU 30 into four 4 megabyte regions, represented by three chip select lines: two for the cartridge connectors 37a (the other not shown) and one for the A/V/CD controller/coprocessor 32. The upper four megabytes and the lower four megabytes are decoded to the A/V/CD controller/coprocessor chip select and the two remaining four-megabyte regions are decoded to two cartridge connector chip selects.

The data processing unit 12 also has a pair of cartridge connectors (one indicated at 37a, the other not shown) for placing a cartridge 14 in circuit communication with the CPU 30 and other system components. The cartridge 14 connects to the data processing unit 12 via a gold plated 70-pin (two rows of 35 conductors) edge card connector 37b. The processor unit 12 has two cartridge connectors 37a for accepting the edge card connections of the edge card connector 37b. The cartridges 14 have gold plated card edge connections to match the conductors of the connectors 37a, allowing the cartridges 14 to be pluggably connected to the processor unit 12. The following signals are communicated to external devices via the cartridge connectors 37a (the other not shown): SYSTEM bus 31 signals, the DSA CD control signals, the I²S CD data signals, a cartridge sense line, power, ground, analog interrupt 1 or 2 (each cartridge has a unique interrupt), GPIO 2 or 3, a lock line (which is a typical signal of the 80376 and 80386SX SYSTEM bus 31), and a cartridge select, which is generated by the first decode chip PALL 35a.

In addition, the processor unit 12 has a single 100-pin (two rows of 50 pins each) edge card expansion connector (not shown in FIG. 1A, indicated generally at 39 in FIG. 4). The expansion connector 39 allows devices to add more memory to the system memory 34 and to add various other features. Devices connected to the expansion connector 39 have gold plated card edges to match the expansion connector, allowing the devices to be pluggably connected to the processor unit 12. The following signals are communicated to external devices via the expansion connector 39: SYSTEM' bus signals (described in the text accompanying FIG. 4), the DSA CD control signals, the I²S CD data signals, an expansion connector 39 sense line, power, ground, CAS and RAS lines, and an expansion connector 39 select, which is generated by the second decode chip PAL2 35b.

The additional circuitry 38 of FIG. 1A is shown in FIG. 1B. Referring now to FIG. 1B, the additional circuitry 38 comprises four devices: a video digital-to-analog converter (video DAC) 40, an NTSC/PAL ("PAL" referring to the well known European television signal standard) encoder 42, an RF modulator 44, and an audio analog-to-digital converter/digital-to-analog converter/compressor/decompressor (ADC/DAC/CODEC) 46.

The A/V/CD controller/coprocessor 32 has a number of functional blocks that will be more fully described in the text accompanying FIG. 4. Suffice it for now that two such blocks are a video controller 66 and a digital signal processor (DSP) 74.

The video controller 66 of the A/V/CD controller/coprocessor 32 connects to an external video DAC 40, which converts the eighteen bits of pixel information (six bits each of red, green, and blue) from the video controller 66 into an RGB signal, as is well known in the art. Each color channel (R, G, and B) of the video DAC is implemented with an R2R resistor tree and a 2N2222 transistor, as shown in FIG. 2. The devices in FIG. 2 are in circuit communication, as shown. The resistors 41a–41j in FIG. 2 are all 0.25 watt resistors with the values shown, within 5% tolerance. The transistor 43 is a 2N2222.

Referring once again to FIG. 1B, the RGB signal is converted to NTSC composite video with the NTSC/PAL encoder 42. The NTSC/PAL encoder 42 accepts the chroma clock, the HSYNC and VSYNC signals, which are generated by the video controller 66 of the A/V/CD controller/coprocessor 32, and the red, green, and blue video outputs, which are generated by the video DAC 40, and generates a composite video signal in the well known NTSC or baseband video format. In the alternative, the well known PAL (European television signal standard) format can be generated. The composite video signal is connected to external devices with a single female RCA type phono jack, as is well known in the art. In the preferred embodiment, the NTSC/PAL encoder 42 is an MC1377, manufactured by Motorola Corp.

The RF modulator 44 merges the composite video signal from the MC1377 with the left and right audio line out signals from the audio ADC/DAC/CODEC 46 onto a carrier frequency to generate an RF video signal, indicated by RF Video, suitable for being directly inputted into the TV 16. To generate the different PAL (European television signal standard) and NTSC formats a different RF modulator and crystal must be used. The RF video signal is connected to external devices with a single female Type F coaxial connector, as is well known in the art.

The audio ADC/DAC/CODEC 46 is linked to the DSP 74 with a serial link conforming to the well known Philips I²S protocol. The ADC/DAC/CODEC 46 converts analog data to digital data, and vice versa, and compresses and decompresses digital data. The ADC/DAC/CODEC 46 interfaces external stereo analog data from optional microphones to the A/V/CD controller/coprocessor 32. The audio inputs are connected to external devices with a standard stereo ¼" connector. The audio ADC/DAC/CODEC 46 also interfaces digital data from the A/V/CD controller/coprocessor to external devices by generating left and right audio line out signals. These signals are connected to external devices, such as optional speakers with two female RCA phone jacks, as are well known in the art. As mentioned above, the audio line signals are also added to the RF video signal.

In the preferred embodiment, the ADC/DAC/CODEC 46 is a CS4216, manufactured by Crystal Semiconductor. The part contains microphone inputs, with programmable gain, as well as outputs with programmable attenuators. Gain and attenuation are both programmably controlled by the DSP 74.

In the alternative, the ADC/DAC/CODEC 46 can be replaced with a TDA1311 DAC manufactured by Philips. If this chip is used, the ADC and CODEC functions will not be available.

Finally, the data processing unit 12 has a second decoder chip PAL2 35b, which is used to implement the chip select for the expansion connector 39. The decode chip PAL2 35b is in circuit communication with the A/V/CD controller/coprocessor 32 and the expansion connector 39 along the SYSTEM' bus 61. The second decode chip PAL2 35b only permits the A/V/CD controller/coprocessor 32 to decode a 128K block of system ROM starting at F20000H. The range from F40000H to FFFFFFH is decoded by PAL2 35b for use by the expansion connector 39. This block of ROM decoded by the decode chip PAL2 35b is used to add ROM to the system 10 via the expansion connector 39.

As shown in FIG. 1A, the program cartridge 14 comprises a program ROM 50 and a locking circuit 52. The program ROM 50 contains code suitable for execution on the CPU 30 in a read only memory format. In the alternative, other memory types, such as battery-backed RAM may be used as the storage device in the cartridge 14. The program ROM 50 is in circuit communication with the CPU 30, as shown in FIG. 1A. In the preferred embodiment, the locking circuit 52 comprises a memory control circuit, such as an address scrambler 54, and a lock control circuit 56.

Figure 3:
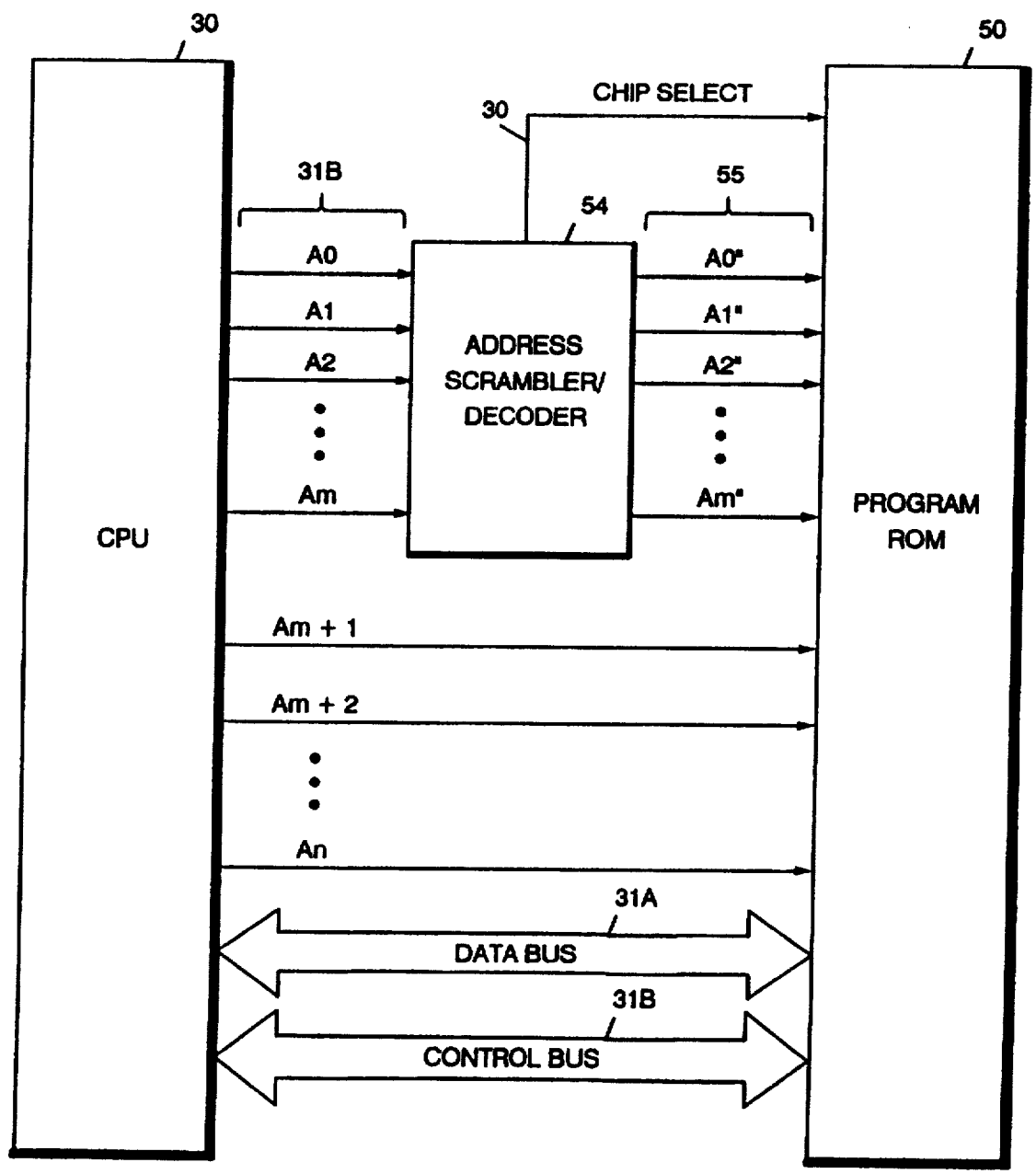
FIG. 3 is a schematic representation of one implementation of the address scrambler of the present invention.

The address scrambler 54 is interposed between the program ROM 50 and the CPU 30 along the ADDRESS bus 31b, generating a scrambled ADDRESS" bus 55, as shown in FIGS. 1A and 3. As shown, the address scrambler 54 need not have every address line as an input. The address scrambler 54 can be implemented such that only m address lines of an n-bit ADDRESS bus 31b need be scrambled. In FIG. 3, address lines $A_0$ through $A_m$ are scrambled to generate $A_0'$ through $A_m'$, which are inputs to the program ROM 50. At least one of the lower two address lines should be scrambled to sufficiently scramble the data. As indicated in FIGS. 1A and 3, the address scrambler 54 also generates a typical chip select 57 for the ROM 50, as is well known in the art.

In the preferred embodiment, the three address lines $A_0$, $A_1$, and $A_2$ of the ADDRESS bus 31b are scrambled to form the ADDRESS" bus 55; the remaining lines of the ADDRESS bus 31b are the same as the ADDRESS" bus 55. Line $A_0$ of the ADDRESS bus 31b is swapped to line $A_2$ of the ADDRESS" bus 55. Line $A_2$ of the ADDRESS bus 31b is swapped to line $A_1$ of the ADDRESS" bus 55. Finally, line $A_1$ of the ADDRESS bus 31b is swapped to line $A_0$ of the ADDRESS" bus 55. This effectively scrambles the data in the ROM 50 rendering it inexecutable. Moreover, each data byte in the ROM 50 still has unique address, allowing the checksum (adding all bytes together without regard for the carry) of the ROM 50 to be calculated before attempting to unlock the cartridge.

The entire locking circuit 52 can be implemented on a programmable logic array (PAL), a programmable logic device (PLD), an application specific integrated circuit (ASIC), or a field programmable gate array (FPGA), among others well known in the art. The lock control circuit 56 comprises a number of comparators in circuit communication with a synchronous state machine. The state machine is initialized into a "locked" state, causing the address scrambler 54 to scramble the address lines. Incorrect addresses keep the state machine in that locked state. As each address in the correct sequence of addresses is asserted onto the address bus, the appropriate comparator indicates the presence of that address, causing the state machine to transfer to the next state. If the correct addresses are presented in the correct order, the state machine enters the "unlocked" state, causing the address scrambler 54 to cease scrambling the address lines. At any time before scrambler 54 is "unlocked," an incorrect address returns the lock control circuit 56 to the initial "locked" state. Once the lock control circuit 56 unlocks the scrambler 54, the lock control circuit 56 keeps the scrambler 54 unlocked until the machine is reset or the system power is cycled.

In the alternative, the lock control circuit 56 can be configured such that at the occurrence of one or more preselected events, the lock control circuit 56 reenters the locked state, causing the address scrambler 54 to rescramble the address lines until the correct sequence of address is asserted onto the address bus in the correct order. Again in the alternative, the lock control circuit 56 need not be designed to require the addresses to be asserted in the correct sequence. Rather, the state machine can be designed to merely require that all the preselected addresses be asserted, without regard to the proper order.

When the system powers up, the lock control circuit 56 causes the address scrambler 54 to scramble one or more of the address lines from the CPU 30 to the program ROM 50. The lock control circuit 56 can also, in addition, be designed to cause the address scrambler 54 to scramble the address lines in response to other events, such as the system being reset, or the expiration of a one-shot multivibrator, which requires the CPU to assert the proper combination onto the ADDRESS bus 31b periodically. The scrambling can take the form of swapping two or more address lines (e.g., swapping address line A3 with address line A6) or mirroring one or more address lines onto one or more other address lines (e.g., causing the signal appearing on address line A3 to appear on address lines A3, A4, and A5 simultaneously). In the preferred embodiment, the address bus conductive paths are not physically scrambled (as would be the case if electromechanical relays were used to scramble the address lines); rather, the signals on the address bus conductive paths are electronically swapped. Moreover, the address scrambler 54 could, in the alternative, utilize multiple scrambling patterns that are randomly selected.

Thus, the cartridge is "locked" and cannot not be used in unauthorized devices. Alternatively, the memory control circuit need not be limited to an address scrambler 54. The locking effect might also be achieved using a DATA bus 31a scrambler or a CONTROL bus 31c scrambler, or any combination or permutation of DATA bus 31a, ADDRESS bus 31b, or CONTROL bus 31c scrambling. Thus, the address scrambler 54 need not scramble the ADDRESS bus 31b lines, because a more generic "bus line scrambler" may be used to implement the memory control circuit.

The address scrambler 54 may be implemented as a multiplexer that switches between the correct addresses and the scrambled addresses responsive to an output from the lock control circuit 56.

The program cartridge 14 is thus "locked" to unauthorized devices because the data being outputted by the program ROM 50 will not correspond to executable code in the proper sequence. Swapping or mirroring address lines will have the effect of substituting individual addresses thereby shuffling the order of the code. Thus any unauthorized device attempting to read the program ROM 50 within the cartridge 14 while the address scrambler 54 is scrambling the addresses will read shuffled opcodes and operands in an order that will most likely be meaningless. In any event, the application program will not execute as expected while the address lines are shuffled.

To "unlock" the cartridge, the CPU 30 accesses one or more addresses along the ADDRESS 31b bus in a particular sequence. The lock control circuit 56 monitors the ADDRESS bus 31b. Once the appropriate sequence of addresses appears on the ADDRESS bus 31b, the lock control circuit causes the address scrambler 54 to cease scrambling the address lines connecting the program ROM 50 to the CPU 30. Once the address scrambler 54 ceases scrambling the address lines, the CPU 30 can access the code in the program ROM 30 and execute the program therein.

Adding the address scrambler 54 and lock control circuit 56 to cartridges 14 will add very little (if any) cost to the program cartridge 14. Typically, cartridges make use of an address decoder within the cartridge 14 to decode the full width of the ADDRESS bus 31b to a memory range appropriate for the program ROM 50. For example, a one-megabyte ROM has twenty address lines; however, typically the entire ADDRESS bus 31b of the CPU 30 is brought out to the cartridge 14. If the CPU 30 is an 80376 or an 80386SX, then the ADDRESS bus 31b is 24-bits wide;

therefore, a memory decoder is required to decode the 24-bit address space down to a 20-bit region. Thus, it is typical for a cartridge 14 to have an address decoder inside.

The address decoder is typically a programmable array logic (PAL) or programmable logic device (PLD). One suitable PAL is the 16V8, which is well known in the art and is manufactured by numerous manufacturers, e.g., AMD Corp. The 16V8 PAL provides enough internal logic to implement the address scrambler 54 and the lock control circuit 56, in addition to the required address decoder. Thus, the locking circuit 52 of the present invention can be implemented into cartridges 14 with little or no additional cost per unit.

The address scrambler 54 provides a way of "locking" program cartridges 14 against use in unauthorized systems. In addition, the system 10 of the present invention provides a means of preventing unauthorized cartridges from being used in authorized systems 10 of the present invention.

Scrambling lines of the ADDRESS bus 31b has the effect of swapping and/or duplicating bytes in the memory space, as compared to the unscrambled memory space. Thus, an unauthorized cartridge is detected as follows: (1) the CPU 30 reads a scrambled block of memory from the program ROM and saves the values to the system RAM within the system memory 34; (2) then the CPU 30 asserts the proper sequence of N addresses onto the ADDRESS bus 31b causing the lock control circuit (if any) within the cartridge to cause the address scrambler (if any) to stop scrambling the address lines; (3) the CPU 30 reads an unscrambled block of memory from the same locations as in step (1) from the program ROM; and (4) the CPU 30 compares the scrambled block of memory and the unscrambled block of memory.

"N" in the above method should be selected to prevent false unlocking by a sequential read of addresses, which is typically performed as part of a checksum calculation or program execution. N=2 is a minimum and is only acceptable if the values are not sequential. In the preferred embodiment, a sequence of approximately six (N=6) addresses will be used. The exact number of addresses used is a direct function of the number of latches and input pins available in the programmable part used to implement the address decoder/scrambler 54. The more latches and input pins available, the larger the state machine implementing the lock control circuit 56 can be.

If the two blocks contain exactly the same data, then the cartridge in question does not have an address scrambler 54 and is, therefore, an unauthorized cartridge, and the CPU 30 can react accordingly (e.g., halting, displaying a message and then halting, entering an endless loop, etc.). On the other hand, if the data blocks read from exactly the same locations in memory are different, then the cartridge does have an address scrambler 54 and the cartridge is deemed to be an authorized program cartridge.

The blocks tested can be of virtually any size. Sixteen bits is a suitably sized block. In addition, the same block of memory need not be tested each time the system 10 checks for an authorized cartridge. Moreover, the lock control circuit 56 can be designed to not cause the state machine to enter the locked state when an incorrect address is asserted onto the ADDRESS bus 31b. Thus the addresses tested could be mixed with the addresses used to unlock the system.

Referring again to FIG. 1A, the interface between the compact disk drive 22 and the data processing unit 12 is shown. Two buses control the CD drive 22: (1) a DSA bus for controlling the CD drive 22 and (2) an I²S CD data bus.

The DSA bus is generated by the I/O coprocessor 36 and the I2S CD data bus is generated by the A/V/CD controller/coprocessor 32.

Referring now to FIG. 4, the Audio/Video/CD Drive controller/coprocessor (A/V/CD controller/coprocessor) 32 electronics are largely contained within one massive custom logic chip, known as an ASIC (Application Specific Integrated Circuit). An A/V/CD controller/coprocessor 32 meeting the description herein may be purchased from MSU Ltd., 270 Upper 4th Street, Witan Gate West, Central Milton Keynes, MK9 1DP England. The A/V/CD controller/coprocessor 32 contains a processor interface 60, a processor cache 62, a memory interface/refresh 64, a video controller 66, an interrupt controller 68, a video blitter 70, a CD drive controller 72, a digital signal processor (DSP) 74, and a DSP memory 76. The processor interface 60, the memory interface/refresh 64, and the video controller 66 are referred to collectively as the video/memory controller 67. The system memory 34, central processing unit 30, and other devices lie outside the A/V/CD controller/coprocessor 32.

The SYSTEM' bus 61 electrically connects the various devices to the system memory 34. Sharing the SYSTEM' bus 61 are six possible bus masters (in order from highest priority to lowest priority, respectively): the memory refresh 64, the video controller 66, the CD drive controller 72, the DSP 74, the blitter 70, and the CPU 30 (through the processor interface 60). Only one of the bus masters may control the SYSTEM' bus 61 (DATA' bus 61a, ADDRESS' bus 61b, and CONTROL' bus 61c between the A/V/CD controller/coprocessor 32 and the system memory 34) at any one time.

The video/memory controller 67 controls the SYSTEM' bus 61, and provides the memory timing signals (e.g., CAS, RAS, write enable, etc.) for memory devices attached to the SYSTEM' bus 61, as is well known in the art. It also requires memory cycles (video memory cycles are required to read video data from system RAM; since video is generated in real time by this process, the video logic must have memory access when video data is needed), and has effectively the highest priority on the SYSTEM' bus 61, as mentioned above. It suspends bus master operations during video lines for brief periods to fetch any video display data, and to refresh dynamic RAM (DRAM). It also controls the interface with the CPU 30.

The DSP 74 is a simple, very high-speed processor for sound synthesis, operating at up to 33 million instructions per second (MIPs). It has access to the SYSTEM' bus 61 via a DSP DMA controller (not shown), which allows it to read and write bytes or words into system memory 34. These transfers occur in short bursts, and are under DSP program control. The DSP 74 actually executes programs and stores data in its own private high-speed memory 76.

The compact disk read DMA channel of the CD controller 72 allows the system to transfer CD read data into system memory 34 without any software overhead. It may transfer data directly, it also contains a CD block decoder.

The interrupt controller 68 interfaces six internal interrupts to the CPU 30: video interrupt (highest priority), analog interrupt 1 (AI1), analog interrupt 2 (AI2), analog interrupt 3 (AI3), CD block decoder interrupt, and DSP interrupt (lowest priority). The interrupt controller automatically clears an interrupt when the CPU 30 performs the interrupt acknowledge cycle. A mask bit is available for each of the interrupts.

The blitter 70 is a graphics processor for fast screen updates and animation, acting as a hardware graphics subroutine for the CPU 30 or DSP 74. It will become bus master through blitter program operation, and may therefore own the SYSTEM' bus 61 for considerable periods. However, its priority over the CPU 30 is not absolute; it may be requested to give up the SYSTEM' bus 61 to the CPU 30 when an interrupt occurs. The CPU 30 is the lowest priority bus master at the system level; however, it has complete control of the other hardware, therefore, the use of the SYSTEM' bus 61 is entirely under CPU 30 program control.

The A/V/CD controller/coprocessor 32 has four major blocks: a video/memory controller 67, a compact disk read DMA 72, a blitter graphics coprocessor 70, and a DSP 74 audio coprocessor. The address space of the CPU 30 is decoded to a number of eight-bit registers within the A/V/CD controller/coprocessor 32. All internal locations are on even address boundaries; word-wide I/O reads and writes may be performed where appropriate. In this particular embodiment, the byte-wide writes may not be performed on word-wide registers and I/O cycles may not be used to access odd addresses.

In addition to the above registers, the A/V/CD controller/coprocessor 32 generates three spare general purpose I/O decoder lines (GPIO1, GPIO2, and GPIO3) from the SYSTEM bus 31, each providing a 32-bit I/O address range. The general purpose decoders may be used to provide three active low chip enables to devices external to the A/V/CD controller/coprocessor 32. In the data processing unit 12, the general purpose decoders are used to decode address ranges to the I/O coprocessor 36 (GPIO1) and the two cartridge connectors 37a (GPIO2 and GPIO3), which are explained more fully above.

The video/memory controller 67 performs four functions: video timing, interrupt handling, video display generation, and memory configuration, refresh, and timing.

The video/memory controller 67 has a flexible video timing generator that can be programmed to suit different TV standards and monitors up to a 640 by 480 VGA standard. The position of synchronization pulses, blanking, display area, active video (when the A/V/CD controller/coprocessor 32 is fetching data from memory) are programmed in clock cycles in the horizontal dimension and in line numbers in the vertical direction. Video timing is broken into two parts. Horizontal timing is defined in terms of clock cycles and is determined by a number of eleven-bit registers. Vertical timing is defined in terms of display lines and is determined by a number of ten-bit registers.

There are nine horizontal registers: horizontal period, horizontal sync, horizontal blanking end, horizontal blanking begin, horizontal display begin, horizontal display end, horizontal fetch begin, horizontal fetch end, and horizontal vertical sync. The value written to the horizontal period register determines the horizontal line length in clock cycles. In one embodiment the line length is one greater than the number written to the horizontal period register. The formula for the required number is: horizontal period=(line length×clock frequency)−one.

The value written to the horizontal sync register determines the width of the horizontal sync pulse. The width of horizontal sync in clock cycles is given by the difference between the horizontal period register and the horizontal sync register. The formula for the required number is: horizontal sync=horizontal period −(horizontal sync width× clock frequency). The horizontal blanking end register determines when the horizontal blanking ends and is the width of the back porch in clock cycles. The horizontal blanking begin register determines where horizontal blanking begins.

The formula for the required number is: horizontal blanking begin=horizontal period−((horizontal sync width+front porch width)×clock frequency).

The horizontal display begin register specifies how soon video is generated after the trailing edge of horizontal sync in clock cycles. If the horizontal display begin register is greater than the horizontal blanking end register the video/memory controller 67 outputs the border color in-between. The value written to this register should normally be chosen to put the picture in the middle of the television screen. The formula for a register number to do this is: horizontal display begin=(horizontal blanking end+horizontal blanking begin− (active display width×clock frequency))/2.

The horizontal display end register specifies where the display ends and therefore determines the width of the video display in pixels. It should be programmed with the following number: horizontal display end=horizontal display begin+(number of pixels×clocks per pixel). If horizontal blanking begin is greater than horizontal display end, then the border color will be output until blanking begins.

The horizontal fetch begin register determines where video fetches first start on the line. This should be programmed such that the sixteen byte pixel buffer has just been filled when the display begins. In practice, this means that the value in the horizontal fetch begin register is given by the value in horizontal display begin less a constant which depends on the display mode. The table below contains the constants for various combinations of bits per pixel and clocks per pixel. For example, if four bits per pixel and five clocks per pixel then the constant is 160. Likewise, if four bits per pixel and one clock per pixel, then the constant is 32. Note that if there are 16 bits per pixel and one clock per pixel, then no constant is applicable.

|  |  | Clocks per pixel | | | | |
| --- | --- | --- | --- | --- | --- | --- |
|  |  | five | four | three | two | one |
| Bits per pixel | four | 160 | 128 | 96 | 64 | 32 |
|  | eight | 80 | 64 | 48 | 32 | 16 |
|  | sixteen | 40 | 32 | 24 | 16 | n/a |

The horizontal fetch end register determines where video fetches end on the line. In principle, this is the value in horizontal display end minus the above constant. However, horizontal fetch begin should be rounded up so that horizontal fetch end register minus the horizontal fetch begin register is a multiple of the above constant.

The horizontal vertical sync is identified as wider sync pulses occurring on a number of lines. The width of these pulses is determined by the horizontal vertical sync register which should be programmed as follows: horizontal vertical sync=horizontal period−(vertical sync width×clock frequency).

The video/memory controller 67 also has a large number of vertical registers: the vertical period register, the vertical sync register, the vertical blanking end register, the vertical blanking begin register, the vertical display begin register, the vertical display end register, the video interrupt register and the light pen registers. The vertical period register specifies the number of video lines per field. The vertical sync register determines the number of lines on which vertical sync is generated. It should be programmed as follows: vertical sync=vertical period−lines of vertical sync.

The vertical blanking end register determines how many lines are blanked after a vertical sync. The vertical blanking begin register determines how many lines are blanked before vertical sync. It should be programmed as follows: vertical blanking begin=vertical sync–lines of blanking prior to vertical sync.

The vertical display begin register determines the first line of active video. If this register is greater than the vertical blanking end register the lines in-between show the border color. To position the active area in the middle of the screen this register should be programmed as follows: vertical display begin=(vertical blanking end+vertical blanking begin–number of active lines)/2. The vertical display end register determines the last line of active video. If this register is less than the vertical blanking begin register the lines in-between will show the border color. To position the active area in the middle of the screen this register should be programmed as follows: vertical display end=(vertical blanking end+vertical blanking begin+number of active lines)/2.

The video interrupt register determines the video line on, which a video interrupt is generated. This interrupt may be enabled or disabled through the INT register. The interrupt occurs when the video mechanism stops at the end of the display line. It may be used by the processor to change display modes or to perform beam synchronous animation. The register may be reprogrammed within a field to provide several interrupts per field.

The A/V/CD controller/coprocessor 32 has a LightPen (or light-gun) input. The first rising edge on this input every field transfers the horizontal count and vertical count into registers LP0 and LP1 one respectively. These values can be converted to the X and Y coordinates of the pixel pointed at. Bit one of register STAT is set if a rising edge on the light-pen input occurred this field. This register bit should be read just prior to vertical sync.

The following table provides typical values for the above registers for the various display formats shown. After loading the registers with the below values, the video timing generator is enabled by setting the VIDEN bit in the register MODE2.

|  | 50 Hz PAL 320 × 256, 8-bits | 60 Hz NTSC 320 × 220, 8-bits | VGA 640 × 480, 8-bits |
| --- | --- | --- | --- |
| Clock frequency | 22.17 MHz | 21.48 MHz | 25.17 MHz |
| Horizontal period | 1418 | 1363 | 790 |
| Horizontal sync | 1314 | 1262 | 703 |
| Horizontal blanking end | 126 | 103 | 48 |
| Horizontal blanking begin | 1271 | 1232 | 688 |
| Horizontal display begin | 378 | 348 | 48 |
| Horizontal display end | 1018 | 988 | 688 |
| Horizontal fetch begin | 346 | 316 | 32 |
| Horizontal fetch end | 986 | 956 | 672 |
| Horizontal vertical sync | 103 | 89 | 0 |
| Vertical period | 312 | 262 | 525 |
| Vertical sync | 309 | 259 | 524 |
| Vertical blanking end | 20 | 15 | 34 |
| Vertical | 307 | 257 | 514 |

-continued

|  | 50 Hz PAL 320 × 256, 8-bits | 60 Hz NTSC 320 × 220, 8-bits | VGA 640 × 480, 8-bits |
| --- | --- | --- | --- |
| blanking begin Vertical display begin | 35 | 26 | 34 |
| Vertical display end | 291 | 246 | 514 |

The video/memory controller 67 has three color resolutions available: four bits per pixel, eight bits per pixel, and 16 bits per pixel. In four- and eight-bit modes, the pixel is a logical color that indexes an 18-bit physical color stored in the palette. In 16-bit mode, the pixel is a physical color in which bits zero to four are blue, bits five to ten are green and bits 11 to 15 are red. Because there are six bits of green but only five bits of blue and red, the least significant bits of blue and red output from the chip are always logical ZERO in 16-bit mode. The border color is a 16-bit register which is displayed as a 16-bit pixel.

In eight-bit mode, the pixel addresses the whole 256 by 18 palette. In four-bit mode the pixel addresses 16 entries from the palette in which case the top four bits of the addresses are supplied from the index register.

Two variations are available in eight-bit mode. In color hold mode if the pixel takes the value zero, then the color of the previous pixel is displayed. This can be used to fill large areas of color simply by setting the left most pixel.

In variable resolution mode, the most significant pixel determines whether the pixel is displayed as one seven-bit pixel or two three-bit pixels. If the bit is clear, the pixel is displayed as one seven-bit pixel; if the bit is set then bits zero to two are displayed first followed by bits four to six. In this case, the two high resolution pixels address eight entries from the palette. The top five bits of the address are supplied from the index register. Variable resolution mode is useful for displaying small regions of high resolution text amid a lower resolution, but more colorful, background. This mode is not available in one clock per pixel resolution.

In eight-bit mode any of the bits can be sacrificed and used for other purposes. For instance, a bit could be used to identify "hot spots" for collision detection. Alternatively, bits could be used to encode image "depth" so that one image can move in front of or behind another. To sacrifice a bit, the same bit in a masked register is set and that bit will be replaced from the corresponding bit in the index register.

There are five widths of pixel: one clock, two clocks, three clocks, four clocks, and five clocks. These correspond to dot clocks of around 24 MHz, 12 MHz, and 6 MHz. The highest dot clock may not be used with the 16 bits per pixel display mode. Two other combinations: one clock 8-bit and two clock 16-bit may only be used if 32-bit DRAM is fitted. If external hardware is fitted, the A/V/CD controller/coprocessor 32 can gen-lock to an external video source and mix (encrust) local video with external video on a pixel by pixel basis.

The memory map of the screen is not tied to the video display width but is defined independently. The base address of the screen can be anywhere in system memory 34. The width of the screen memory is the power of 2 from 128 to 2048 bytes. The height of the screen is a power of 2 from 32 K to 2 megabytes. Video addresses on the same line wrap within the smaller boundary. This arrangement allows the screen to be placed within a larger virtual screen and panned and scrolled within it.

Various registers control the video modes discussed above. The video mode register controls the features listed above. Bits zero and one determine the number of bits per pixel. Bits two and three determine the pixel width in clock cycles. Bits four through six determine the first break in the video address and hence the display width in bytes. Bits seven through nine determine the second break in the video address and hence the display height in bytes. Bit ten turns the sync outputs into inputs which can reset the horizontal and vertical timers for rapid locking to an external video source. Bit 11 controls encrustation, which is the overlaying of an external video source using an external video multiplexer. The multiplexer is controlled by the "INC" pin of the A/V/CD controller/coprocessor. Selected bits of the color are used to control encrustation. Bit 12 controls border encrustation, which is the same as bit 11 but only applied to border colors. Bit 13 sets a variable resolution mode. Bit 14 sets the color hold mode, in which color 0 is replaced by previous non-zero color in current scan line. Bit 15 enables Pixel clock widths of three and five based on Bits 2, 3, and 15, as shown in the table below.

| Bit 2 | Bit 3 | Bit 15 | Pixel Clock |
|---|---|---|---|
| 0 | 0 | 0 | Four clock cycles/Pixel |
| 1 | 0 | 1 | Two Clock Cycles/Pixel |
| 0 | 1 | 0 | One Clock Cycles/Pixel |
| 1 | 1 | 0 | Undefined |
| 0 | 0 | 1 | Three Clock Cycles/Pixel |
| 1 | 0 | 1 | Five Clock Cycles/Pixel |
| 0 | 1 | 1 | Undefined |
| 1 | 1 | 1 | Undefined |

The video/memory controller 67 also has a pixel mask register and a palette index register. For every bit set in the mast register, the corresponding bit in the pixel is replaced by the bit from the index register. The upper bits in the index register form the high part of the palette address for 4-bit pixels. The border color register is a 16-bit register that defines the border color. The color is displayed in the same way as 16-bit pixels: bits zero to four are blue, bits five to ten are green, and bits 11 to 15 are red.

The video/memory controller 67 also has two screen address registers that define the 24-bit base address of the screen in system memory 34. This is the address of the top left pixel on the screen.

The video/memory controller 67 also has an auxiliary video mode register MODE2 that provides additional control over video and various test logic. Bit zero enables the light-pen registers so that the horizontal and vertical counters can be read. Bit two enables the video timer, bits three and four determine the refresh frequency with one indicating a refresh frequency of clock/128, two indicating a refresh frequency of clock/256, and three indicating a refresh frequency of clock/512. Most DRAMs require a refresh frequency of 64 KHz or above. The refresh controller waits until eight or more refresh cycles are required then requests the SYSTEM' bus 61 and does the required number of CAS before RAS cycles. When bit six is set, the video mode is double buffered and can only change during blanking. The CPU 30 sets this bit for clean mode changes in split screen operation. Bit seven inverts the polarity of vertical sync. Bit eight inverts the polarity of horizontal sync and bit nine is not used.

The palate is a 256 by 18 bit block of RAM at F10000H-F103FFH. Each entry contains six bits each of green, red, green and blue. Each entry extends across two words. The blue and green bits appear in the high word. The red bits -appear in the low word. Bits two through seven of the high word are blue; bits 10 through 15 of the high are green and bits two through seven of the low word are red. To write to an entry in the palette, the CPU 30 must first write the red bits to the low word, then the green and blue bits to the high word. The CPU 30 should only write to the palette during border or blanking or speckles will appear on the video.

The cache 62 is not a cache in the sense that it prefetches instructions for the CPU 30. Rather, the cache 62 is a 512×16-bit static RAM located at F14000H to F143FFH that can be used by the CPU 30 for variables, stack, or program code to speed up program execution. It comprises static RAM and is not subject to page faults. Placing data, stack, or program code in the cache 62 allows quicker accesses and fewer page faults. In this embodiment, the cache is small and byte writes are not allowed to the cache area. Interrupt service routines may not push bytes onto the stack.

Video/memory controller 67 supports six interrupt sources: video input interrupt, three analog interrupts, CD block decoder interrupt, and a DSP 74 interrupt. The analog interrupts allow simple analog-to-digital converters to be implemented. A monostable vibrator is implemented from a diode, a capacitor, and a potentiometer. The capacitor is discharged by vertical sync and begins charging at a rate dependent on the potentiometer setting. When the voltage on the capacitor reaches the threshold of the input to the A/V/CD controller/coprocessor 32, an interrupt is generated. The processor can then read the vertical counter to get a measure of how quickly the capacitor charged, an hence the potentiometer setting.

The video/memory controller 67 also has an interrupt enable register allowing all six interrupts to be independently enabled or disabled, writing a logical ONE to any bit in the interrupt acknowledge write register clears the corresponding interrupt. The interrupt read register reflects all pending interrupts.

The video/memory controller 67 decodes the 16 megabyte address range of the 80376 CPU 30 into the following memory map: eight megabytes of DRAM0 (0H-7FFFFFH), seven megabytes of DRAM1 (800000H-EFFFFFH), 64 kilobytes of ROM0 (F00000H-F0FFFFH), 64 K of internal memory (F10000H-F1FFFFH), and a 896 K block of ROM1 (F20000H-FFFFFFH). The 64 kilobytes of internal memory comprises palette RAM, blitter registers, and DSP registers and memory. The palette address range was stated above. The blitter registers extend from the range F10400H to F107FFH. The DSP memory extends from F10800H to F18000H.

The on-board screen RAM and system RAM is 512 K of DRAM. The on-board DRAM comprising the screen/system RAM may be either 16-bits or 32-bits wide. Suitable DRAM are the TCS14170BJ 256 kilobyte by 16-bit memory chip, manufactured by Toshiba. The size of the DRAM is determined by the A/V/CD controller/coprocessor 32 during reset but does not directly affect the CPU 30. Instead, it allows the video/memory controller 67 to operate more quickly leaving more bandwidth available to other bus master candidates. Certain display and blitter modes are only possible with 32-bit memory. Two banks of DRAM may be attached, as indicated above. If small amounts of DRAM are attached, then they will be repeated throughout the memory map shown above.

The bootstrap ROM is always 16 bits wide. The bootstrap ROM comprises two 27C512 erasable programmable read-only memories, manufactured by numerous manufacturers, thereby giving 128K of bootstrap ROM. Following a reset, the one megabyte window from F20000H to FFFFFFH containing ROM and internal memory is repeated throughout the 16 megabyte address range. This allows for a variety of processors to boot with the A/V/CD controller/coprocessor 32. The memory map above is adopted the first time with the memory type register is written to by the CPU 30. The video/memory controller 67 performs page mode cycles on the system memory 34 wherever possible. These are quicker than normal memory cycles and occur if successive reads and writes are within the same page. The video/memory controller 67 needs to know the number of columns in the DRAM, which is programmed in the memory type register. In the memory type register, bit 0 and 1 determine the number of columns in the DRAM, with 0 indicating 256 columns, 1 indicating 512, 2 indicating 1024, and 3 indicating 2048.

The video/memory controller 67 supports seven types of transfers: a normal DRAM cycle (4 clocks), a page mode DRAM cycle (two clocks), ROM cycles (6 clocks), internal memory (2 clocks), external I/O (6 clocks), interrupt acknowledge (2 clocks), and internal I/O (2 clocks). The CPU 30 will cycle in one more clock cycle than the actual transfer. Internal bus masters can cycle in the transfer time.

The video/memory controller 67 uses a crystal oscillator for a crystal that is the 2× (2 times speed) clock for the CPU 30 and is a multiple of the television chrominance (chroma) subcarrier. This crystal clock is buffered and output to the CPU 30. The same clock is put through a divide by two and this is output as the main system clock. This clock is input to the A/V/CD controller/coprocessor 32 through a separate pin. The reason for outputting and inputting the clock is so that the relative skew between the CPU 2× clock and the main system clock, can be adjusted one way or the other by adding small delays to either path. The crystal frequency also is divided by a programmable divider which can divide the crystal frequency by a number between 1 and 15 and produce an output waveform with an even mark to space ratio. This is used as the television color subcarrier.

The chroma divider register is a 4-bit register that defines the ratio of the television color subcarrier (chroma) to the 2× crystal frequency. It should be programmed as follows: chroma=2× crystal frequency/chroma frequency−1.

The video/memory controller 67 also has a status register. If the status register bit 0 is set, the video timing should be set up for PAL (European television signal standard). If bit 0 of the status register is clear, then the video timing should be set up for NTSC. If bit 1 of the status register has been set, then there has been a light-pen input in the current field. This bit is set by the light-pen and cleared by the vertical sync.

The video/memory controller 67 can be put into a mode during reset after which it only responds to two-word wide I/O locations and 64 K memory locations. The actual location of the I/O locations is determined by a chip select input so the locations can be determined externally. This "peephole" mode allows the A/V/CD controller/coprocessor 32 to occupy only small gaps in the I/O and address memory map of the system 10.

The registers are 32-bits wide and must, therefore, be accessed as two 16-bit accesses. To address all the I/O registers within the A/V/CD controller/coprocessor 32, the regular I/O address of the required register is first written to the lower word (a[1] low) then that register can be read or written at the upper word (a[1] high). To address all the memory inside and outside the A/V/CD controller/coprocessor 32 the 64K window can be moved to any 64K boundary in the 16M address space normally decoded by the video/memory controller 67 by writing to the bank register. The bank register is an eight-bit register providing the eight most significant bits when addressing memory in peephole mode. For example, to access the palette, formerly at F10000H, the CPU 30 must write 0F1H to the bank register and then read and write at the bottom of the peephole location, determined by the external chip select.

The blitter 70 is a graphical coprocessor whose purpose is to perform graphics creation and animation as fast as possible (limited by the memory bandwidth). It executes commands written by the CPU 30 and the DSP 74 into memory. It can perform arbitrarily long sequences of graphics operations by reading new command sets from system memory 34. While it is performing graphics operations, the blitter 70 becomes a SYSTEM' bus 61 master, and denies the CPU 30 any bus activity whatsoever. This is reasonable because the blitter 70 is being used to perform operations that the CPU 30 would otherwise have performed, and is therefore speeding up program operation. This also removes the need for any synchronous control programming for blitting operations and the need for any interrupt generation hardware in the blitter 70. However, to allow real time programming of either of the other two processors (the DSP 74 and the compact disc DMA), the blitter 70 will suspend its operation and grant the SYSTEM' bus 61 to the DSP 74 or the compact disc DMA channels if they require a DMA transfer. It will also suspend itself and give up the SYSTEM' bus 61 to the CPU 30 if an interrupt occurs. During any of these transfers, the current operation is suspended but will restart when the interrupt signal becomes inactive or when the DSP 74 DMA access completes.

The operation of the blitter 70 is best viewed as a simple program:

```
read command from memory
for n=0 to outer_count
    read parameters from memory
    for m=0 to inner_count
        if SRCEN then read source from memory
        if DSTEN then read destination from memory
        write destination to memory
    next m
next n
```

The commands and operands are written to memory by either the CPU 30 or the DSP 74.

The blitter 70 has several registers in the A/V/CD controller/coprocessor 32 I/O space: (1) two writable blitter program address registers, which share the same I/O address as two readable blitter destination registers, (2) a writable blitter command register, which shares the same I/O address as a first readable blitter source address register, (3) a writable blitter control register, which shares the same I/O address as a second readable blitter source address register, (4) a readable inner count register, (5) a first writable blitter diagnostics register, which shares the same I/O address as a readable blitter outer count register, (6) a second writable blitter diagnostics register, which shares the same I/O address as a readable blitter status register, and (7) a third writable blitter diagnostics register.

The blitter 70 may be operated in a variety of modes to perform graphics and block move operations. The blitter 70 has an internal architecture divided into three largely separate blocks: the data path, the address generator, and the sequencer. The data path contains three data registers: the source data register, the destination data register, and the pattern data register. The data path also contains a versatile comparator to allow intelligent blitting operations, and a logic function unit (LFU) to generate the output data.

The address generator contains three address registers: these are the program address register used to fetch blitter commands, and the source register and the destination address registers. It also contains an arithmetic logic unit (ALU) with an associated step register to update addresses, and a multiplexer to generate the output address.

The sequencer acts in software terms as the program that the blitter 70 runs, with two loops (an inner loop and an outer loop) and a several procedures, as illustrated above with the short simple program. The program is fixed, although various parts of its operation are conditional upon flags in the blitter command register and the loop counts are also part of the command.

The data path contains three data registers and two data manipulation blocks: the logic function unit, which can combine the contents of the data registers in a number of useful ways to produce the output data, and the comparator, which can perform certain comparisons on the data to inhibit write operations, and optionally stop blitter operation.

The data path can handle data of four sizes: 32-bit, 16-bit, 8-bit, and 4-bit. Long words (32-bits wide) are used when performing fast block moves and fills. Pixels (4-, 8-, or 16-bits wide) may be manipulated using all the blitter modes, such as line-drawing, multiple plane operations, character painting, etc.

The majority of the data path is 16-bits wide, which is the maximum screen pixel size. However, the source data register is 32-bits wide, and the top 16-bits of the source data register are used to produce the top 16-bits of the data written in 32-bit mode, regardless of the mode of the logical function unit. Thus, there are two 16-bit wide registers (pattern data and destination data) and one 32-bit wide data register (source data register). The source and destination data registers are loaded from the source and destination addresses in system memory 34 when the corresponding read cycles are enabled in the inner loop. However, all three data registers are loaded at the start of blitter operation with the pattern data, and this may be used as an additional source of data, either in producing the output data or in the comparator. For example, the data in the pattern data register could be a mask, a pattern for writing, or a reference value, for example. The pattern data is loaded into both words of the source data register.

The logic function unit generates the output data, which is written to the destination in system memory 34. It can perform any logical combination of the source and destination register pixels. "Source data pixels" may be selected from either of the source data register or the data pattern data register. The LFU selects any of the four Boolean minterms (A & B, $\overline{A}$ & B, A & $\overline{B}$, and $\overline{A}$ & $\overline{B}$) of the two sets of input data from the data registers, and generates the logical OR of the two selected minterms. This allows any logical combination of input data; thus 16 functional possibilities exist.

In 32-bit mode, the LFU will normally be set to produce source data, because it is only 16-bits wide. The upper sixteen bits written during a long-word write are always derived from the top sixteen bits of the source register.

The comparator can perform a variety of comparisons on the data in the source, destination, and pattern data registers. If its comparison conditions are met, then it generates an inhibit signal. The inhibit signal is used to inhibit a write operation, and optionally, to stop the blitting operation. The comparator may also be used to provide a pixel plane effect, to give transparent colors, for collision detection and system memory 34 search operations, and as an aid to character painting.

A multiple plane operation is supported by assigning a plane number to every pixel. This mode is only applicable to 4 and 8-bit pixels. In 8-bit pixel mode, two of the 8 bits (bits 6 &7) are used giving two or four planes; in 4-bit (nibble) pixel mode, one of the 4 bits (bit 3 & bit 7 of the two-nibble byte) is used giving two planes. The comparator can produce an inhibit output if the plane number of the destination data is not equal to or greater than the plane number of the source data, or any combination of these. This means the data being written onto the screen can be masked by data already present in a different plane.

The comparator can produce and inhibit output if the entire source pixel is equal to or not equal to the destination pixel. This may be used, for example, for searching system memory 34 for a particular value and, more importantly, for designating a color to be transparent and holding the transparent color value in a data register. This applies to 16-, 8-, or 4-bit pixels.

The blitter 70 also has a comparator bit to pixel expansion mode operation. This comparator operation allows bit to pixel expansion of data, used, for example, for character painting. In this mode, the comparator selects a bit of the source byte based on the value of the inner counter and inhibits the write operation if this bit is a logical ZERO.

The blitter 70 makes provision for handling three pixel resolution modes. These are: 16-bit mode where each word corresponds to one pixel, 8-bit mode, where each byte corresponds to one pixel, and 4-bit mode, where each byte corresponds to two pixels. In 8- and 16-bit pixel modes, the data path is handling one pixel at a time, and operation is straight forward. In 4-bit pixel mode, however, only half of the byte that is read from or written to system memory is the current pixel, therefore, certain additional requirements are placed on the data path. In a 4-bit mode write operation, unchanged destination data is written to the half of the data byte that does not correspond to the current pixel. Thus, destination reads must always be enabled in 4-bit mode (set control bit DSTEN). This must be done because there is no provision for writing less than one byte into main memory.

It is also possible that the source 4-bit pixel address and the destination 4-bit pixel address point in different halves of the corresponding bytes of RAM. If this is the case, a shifter swaps the two halves of the source data. In 4-bit mode, the two nibbles (half a byte; 4 bits) of the pattern byte should normally be set to the same value. Note that the pixel with program in the blitter 70 does not have to match the display width, and the most efficient way of moving large amounts of data is 32-bit mode. Recall that such mode transfers must be long-word aligned and the system must be fitted with 32-bit RAM.

The blitter 70 also has an address generator. The address generator contains three address registers, an increment or step register, an address adder, and an address output multiplexer. The three address registers hold the source address, the destination address, and the program address. Each of these registers is a 24-bit register allowing the blitter 70 to address up to 16 megabytes. In addition, the source and destination address registers contain a nibble bit used in 4-bit pixel mode. The program address register holds the address that the program is fetched from, and is incremented by one word each time a memory cycle is performed using it. This register is always even, thus, bit 0 must always be a logical ZERO.

The source and destination address registers are updated after each cycle, and at other times, using an adder that allows them considerable flexibility in the objects to which they refer. All source and destination address updates, may be performed optionally on just the bottom 16 to 19 bits of the address register. This means that the blitter 70 will then effectively operate in 64K, 128K, 256K, or 512K pages. In this mode, if an address overflows within a page, it will wrap and the overflow or underflow will be lost.

The blitter 70 also has an address adder, which is a 25-bit wide adder used to update addresses. It allows either a constant value of 0.5, 1, or 2 or a variable stored in one of the step registers, to be added to an address value. It can also subtract the same values. The 25th bit is the nibble part of the addresses, as stated above. An increment of one pixel has a different effect on the address depending on the current setting of the screen resolution.

All address registers are updated automatically at the end of the appropriate memory cycles; source read for the source of address register, and destination write for destination address register. Addresses can be made to wrap vertically by using the SWRAP and DWRAP bits in the blitter command, and horizontally by using the SLWRAP and DLWRAP bits in the blitter control register.

The address output multiplexer provides the external address to the system memory 34. It provides three types of addresses: source address, destination address, and the program address. These are derived directly from the corresponding address registers.

When the blitter 70 is drawing lines, the address registers are used in a different way than normal. The destination address register is used as the line draw address, and the source address register and the step register are used as delta one and delta two respectively. During line drawing delta two is subtracted from delta one, and the borrow output produced is used to determine what is added to the destination address register. For further details, see the section on line drawing below.

The blitter 70 also has a sequencer which controls the operation of the blitter 70. The flow of control is best considered at two levels. There is an outer loop governing the overall flow of control and an inner loop which performs the actual blitting or line drawing operation. The three sections within the outer loop: the command read procedure, the parameter read procedure, and the inner loop.

The inner loop performs the actual blitting or line drawing operations. An inner loop cycle can contain up to three memory cycles. These are a read from the source address, a read from the destination address, and a write to the destination address. All three cycles are optional. If the loop includes a source read, or a source read and a destination read, then the comparator inhibit mechanism is tested before the destination write occurs. This allows the write cycles to be bypassed when a comparator inhibit condition is met. When the comparator inhibit conditions are met, it is possible to have the current operations cease and control returned to the CPU 30. The program may then examine the address registers to determine where the inhibit has occurred, so that collision detection may be performed. The CPU 30 may then determine whether to resume the operation or abort it. The inner loop performs operations until the inner loop counter reaches zero. The inner loop counter is a 10-bit counter, so the inner loop can iterate any number of times from 1 to 1024.

The blitter 70 makes provision for collision detection by allowing operation to stop when a comparator write inhibit occurs. When this happens, control returns to the CPU 30, which may then examine the internal state of the blitter 70 to determine what has caused the collision. At this point, the CPU 30 may choose to allow the blitter 70 to resume the operation it was performing, or may reset it back to its idle state. Either a reset or a resume command must be issued before the blitter 70 may be used for another operation. Note that while the blitter 70 is in the suspended state, a new value may be written to the command register, so that the collision stop mechanism may be disabled.

The parameter read procedure is a very straightforward sequence that loads a new set of parameters to the inner loop. It reads from memory, in order, the inner loop counter value, the step register values, and the pattern value, which is used to preset the data registers. The inner count effectively becomes the number of times the inner loop is executed. The step registers are used for address incrementing and the pattern register is used for data manipulation.

The parameter read procedure is called as part of a command read procedure at the start of a blitting operation and is also called if required by a blitting operation, as determined by the PARRD control bit. Extra parameter reads occur between passes through the inner loop to allow parameters to be altered, thereby allowing operations such as irregular shape painting and run-length encoded data decompression.

The command read procedure is used to start a new blitting operation. The blitter 70 starts in an inactive reset state, which represents the normal inactive state of the blitter 70. From this state a command register write is performed to start the blitter 70, usually preceded by a write to the program address register. A full set of operational parameters is loaded from program count address which is auto-incremented, and control passes out of the command read loop. When a blitting operation is complete, a new command is read from the program count address and if this command leaves the blitter 70 in run mode, then a new set of parameters is loaded and another operation is started. Otherwise the blitter 70 enters its stopped state and returns the SYSTEM' bus 61 to the CPU 30. The above mechanism allows the blitter 70 to perform arbitrarily long sequences of graphics commands without requiring any processor intervention. This is extremely useful because processor I/O write cycles are relatively slow in comparison to blitter memory reads.

Normal operation of the outer loop starts on exit from the command read loop. The parameter read loop is then entered to read the first set of parameters and the inner loop is entered with the inner counter being loaded to its initial value before the start of operation. The outer counter is then decremented, and, if it is zero, the command read loop is entered. Then either or both of the source address and destination address registered may be updated with the contents of the step register. The parameter read loop may then be optionally entered to update various inner loop parameters, before the inner loop is entered again. The two loops allow the blitter 70 to perform operations on with two-dimensional screen structures, with the outer loop address register updates moving screen address pointers onto the start of the structure on the next line. The parameter read loop adds flexibility while allowing the screen structure parameters to be altered on a line-by-line basis.

The blitter 70 also has a memory interface state machine, which controls the cycle timing generation and the bus arbitration of all memory cycles. The blitter 70 assumes control over the SYSTEM' bus 61 from the CPU 30 for the duration of a blitter command sequence. This is subject to the bus handover latency discussed above, but as soon as the blitter 70 is granted the SYSTEM' bus 61 its operation will start. In the preferred embodiment, the blitter 70 allows the CPU 30 to access the cartridge ROM 50 and the cache 62 while any device within the A/V/CD controller/coprocessor has control over the SYSTEM' bus 61. However, for simplicity, in the alternative, the blitter 70 can halt the CPU 30 while the CPU 30 is not the SYSTEM' bus 61 master.

The memory interface will give up the SYSTEM' bus 61 to the DSP 74 or the compact disc read channel as soon as one of these requests the SYSTEM' bus 61, pausing only to complete any current memory cycle.

Interrupts will also cause the blitter 70 to suspend operation, unless masked in the blitter control register. The blitter 70 detects the state of the interrupt line itself and uses this to suspend operation. Operation will resume as soon as the interrupt line resumes to its prior state, which occurs when the CPU 30 write to the acknowledge port occurs. This may not be necessarily the end of the interrupt service routine, therefore programmers should be wary of stack crawl, and should normally keep interrupts disabled during a service routine. The blitter 70 resumes operation as soon as the interrupt line is cleared without intervention from the CPU 30. The blitter 70 only responds to the internal interrupt sources (the video interrupt the analog input interrupts and compact disk interrupts). Any external CPU interrupt source has no effect on the blitter 70.

The blitter 70 has numerous modes of operation. The simplest operations performed by the blitter 70 are those involving copying one block of system memory 34 to another and filling a block of system memory 34 with a predefined value. These operations can be performed on linear parts of system memory 34 and on arbitrary screen rectangles. The destination data register is used as the address of the system memory 34 being modified and the source address register is used as the address of the data being copied, if it is a copy operation.

When the operation is to be performed on linear areas of memory, most of the address control bits will be set to zero. The step register is not used, and the only requirement is to determine whether the copy will be made with the address incrementing or decrementing, in setting DSIGN and SSIGN appropriately. Note that the initial value placed in the address register should be the bottom of the area upon which the operation is to be performed if the sign bit is not set and at the top if it is set. In both cases, the first pixel read or written will be the first address. The length of the operation will be placed in the inner counter and the outer counter set to one.

If the block being operated upon is very large, both the inner loop counter and the outer loop, may have to be used and the number of pixels operating on will be given by the product of the inter and outer counter values. When either or both of the source and destination data are rectangles rather than linear areas, then the inner loop counter will contain the rectangle width and the outer loop counter the rectangle height.

The appropriate step register is set to the address increment from the right-hand side of the rectangle around to the left-hand side on the next line. The SRCUP and DSTUP bits are set according to whether the source or destination are rectangles. In 8- or more bits per pixel mode, neither SRCEN nor DSTEN will be used for memory fill, bit SCRCEN should be set for memory copy. In 4-bit pixel mode, DSTEN must always be set as well, so that a destination read is performed to avoid corrupting the other pixel. Note that using this method will be slower than otherwise.

The blitter 70 draws lines based on the well known digital differential analyzer (DDA) algorithm. The basis of this algorithm is that for a given line one of the X address or the Y address is always incremented for every pixel drawn, while the other one is also incremented if a suitable arithmetic condition is met. The algorithm used by the blitter 70 computes the arithmetic condition that causes the conditional increment by repeated subtraction of the smaller of dx or dy from a working value with the larger being added back when underflow occurs, effectively using division to calculate the gradient. The notation "dx" refers to the distance along the X axis that the line corresponds to and is given by |(X1−X2)| where X1 and X2 are the X coordinates of the 2 points and the vertical bar notation means the magnitude or absolute value of their difference. Thus if a line is being drawn from (X1,Y1) to (X2,Y2), then dx=|(X1−X2)| and dy=|(Y1−Y2)|. From these, D1 (referred to as "delta one" above) is given by the larger of dx and Dy, D2 (referred to as "delta two" above) by the smaller. Then, for each pixel drawn, D2 is subtracted from a working value which is initially set to D1/2 and the sign of the result of this subtraction (indicating underflow) is the arithmetic condition for the conditional part of the screen address update. When this underflow occurs, the original value of D1 is added back to the working value. It can be seen that the ratio of dx to dy will give the frequency with which of this underflow and adding back occurs. The ratio between them is of course the gradient of the line.

The values used to create a line draw are set in the blitter command as follows: the starting point of the line is the destination address, D1 is placed in bits 10 to 19 of the source address register and D1/2 is placed in bits 0 to 9. D1 is also the inner counter value although D1 plus 1 should be used if both end points of the line are to be drawn. D2 is placed in the destination step register. If DX is greater than DY, then the YFRAC flag is set, otherwise it is cleared. SSIGN gives the sign of the X-address updates, DSIGN gives the sign of the Y-address updates.

While drawing lines, all the registers in the address section are occupied in computing the line address; thus the blitter has no ability to move data from somewhere else when drawing lines. Therefore, the data written at the line address has to be given either directly by the pattern data or by combination of the pattern register and the data already there, according to the logical function unit. Consequently, SRCEN should not be set, otherwise the blitter would produce seemingly random data. While drawing lines the inner counter is set to the length of the line, and the outer counter is set to one. In 8 or more bits per pixel mode, DSTEN need not be set, unless used for read-modify-write operations. In 4-bits per pixel mode, DSTEN must always be set so that a destination read is performed to avoid corrupting the other pixel.

The blitter 70 also has the ability to paint characters on the screen in a single operation. Character painting as far as the blitter 70 is concerned involves painting a rectangular area up to 8 pixels wide and of arbitrary height. The pixels in this area are either written to or left unchanged according to a bit pattern. This mode is not restricted to character painting, but may also be used to expand any graphics stored as a monochrome bit plane.

During character paints, the source register addresses the bit pattern, normally part of the font, where each byte corresponds to one row of the character. Thus, blitter fonts may be up to 8 pixels wide however, wider fonts may be used, but these will require more than 1 blitter paint operation to paint a character. Character painting is essentially a block move from the character font located in system memory 34 to the destination address.

The data is arranged with the bit corresponding to the left-most pixel in the least significant bit, and the top of a character at the lowest address. If the data is less than 8 pixels wide, then the least significant bits of the font data are not used.

The destination address register is used to address the area of the screen to which the character is to be painted. Normally this area has been cleared to the required background color by a previous blitter operation. The destination address is initialized to the top left-hand corner of the character. The character to be painted is a rectangle, and, therefore, the destination address is programmed correspondingly. The inner counter is sent to the width of the character and the outer counter to its height. The destination step register is set to the screen width less the width of the character. The DSTUP bit is used to allow the destination address to be updated between passes through the inner loop.

Inner loop control bits DSTEN and SRCENF are set, character painting being the reason for the existence of SRCENF. This allows the font byte for each row to be read just once. The comparator is used to control the painting of pixels, therefore the CMPBIT control bit is set, to enable its bit to byte expansion mechanism.

The color to be painted is set as the pattern, and this will normally be held in the pattern data register. In 4-bit pixel mode, DSTEN will be set, and the destination data register will hold the read values so that the other half of the byte may be written back undisturbed. The source data register holds the font pattern, as mentioned above.

The blitter rotate and scaling mode uses the shading ALU, but instead of producing three DDA-based data values, it produces two DDA-based address values, X and Y. Normally, these values are used to traverse a source data field at arbitrary angles and rates so that the destination data corresponds to a scaled and/or rotated version of them.

The red value generator gives the X value and the green value generator gives the Y value. The blue value generator is not used, and clearly shading cannot be used in conjunction with this mode. As the rotation requires higher accuracy than shading, four extra integer bits are added to the X and Y values. These are set up in rotate registers zero and one. All calculations are performed to 10 point bit accuracy.

As with shading, the delta values are added to X and Y after each pixel is drawn in the inner loop. The step values are added in the outer loop, and both the SRCUP and DSTUP flags must be set for them to be added. The delta and step values may be either positive or negative, and no add or saturation occurs, unlike shading mode.

Normally, rotation and scaling are performed by setting the destination address pointer to performing normal raster scan over the destination rectangle, while the source pointer traverses over the source data at a suitable gradient and rate. This ensures that the destination data is contiguous, and that no more blits (blitter operations) than necessary are required. The source data should be surrounded with a suitable transparent color if the target area is not rectangular.

A blitter command is given as a table of data in memory. The blitter 70 loads the contents of the table into its registers and performs the specified operation. The blitter 70 will receive successive sets of commands until a STOP instruction is read into the command register.

The blitter program address must be set up before the command word is issued. The blitter program address is given by the program address registers, which together form the full 24-bit address. The program must lie on a word boundary.

A full table of blitter command data starts with a command word. However, the first blitter command in a sequence has its command word written to the command register by an I/O cycle of the CPU 30; thus, the blitter command starts reading the command data from the second word. Similarly, the last blitter command need consist of no more than a command word with the run bit clear.

A blitter command takes the form of numerous command bits and control bits, a 24-bit source address, a 24-bit destination address, a 10-bit outer count value, a 10-bit inner count value, a 12-bit signed source step, a 12-bit signed destination step, and a 15-bit pattern value. If the SHADE bit is set, then 9 additional words are fetched: red, green and blue initial values (6 integer bits and 10 fraction bits), red, green and blue delta values (same) and red, green and blue step values (same).

The command bits are as follows. Setting the RUN bit causes the blitter 70 to start operation. It is used when writing to the command register as an I/O port to start the blitter 70 reading a command. If the blitter 70 loads a command with the RUN bit cleared as part of a command read, then operation ceases. Setting the COLST bit causes operation to stop if a collision (write inhibit) occurs. From that point, print operation can be resumed by the CPU 30 or aborted, and various internal registers may be read. Setting the PARRD bit requires the blitter 70 to read a new parameter set from the program counter address, every time the inner loop exits and the outer loop has not reached zero. Setting the SRCUP bit requires the contents of the step register to be added to the source address on exit from the inner loop if the outer count has not reached zero. Setting the DSTUP bit requires the contents of the step register to be added to the destination address on exit from the inner loop if the outer count has not reached zero. Setting the SRCEN bit enables the source address read in the inner loop. This also causes the source address register to be incremented according to the pixel size. Setting the DSTEN bit enables a destination address read in the inner loop. This does not affect the destination address register, which is incremented as part of the destination write cycle. Setting the SRCENF bit causes the source address to be read when the inner loop is first entered, but not subsequently entered. This is a special case of SRCEN and is relevant to the character paint mode, as described above. SRCENF has no affect if SRCEN is set. The two bits PSIZE0 and PSIZE1 select the pixel size, 0 to 3 corresponding to 4, 8, 16, and 32 bits respectively. 32 bits is for data moves in a 32-bit system only, as described above. The 2-bits WIDTH0 and WIDTH1 select the screen width, in bytes, 0 to 3 corresponding to 256, 512, 1024, and 2048 bytes, respectively. Setting LINDR puts the blitter 70 into line-drawing mode. This mode uses both the source and destination address registers to generate the line-draw address, which may be used for both reading and writing. Setting the YFRAC bit indicates to the blitter 70 which of the X and Y addresses have the fractional increment in line-drawing mode. It is set if the Y address has the fractional increment. Setting the PATSEL bit selects the pattern data register to replace the source data register as the source input to the logical function unit. This bit is relevant to character painting, where the source data register will contain the font data, and the pattern data register contains the ink color. Setting the shade bit enables output from the shading ALU as write data. This bit is only valid for 8- and 16-bit pixels.

The blitter 70 has several types of control bits: source control bits, destination control bits, logic function unit control bits, and comparator control bits. The blitter 70 has several source control bits. Setting the SWRAP bit causes source address updates to wrap on a programmable boundary, as opposed to running linearly through memory. Bits SWRAP0 and SWRAP1 control the size of the SWRAP function, which makes the source address pointer wrap vertically, with 0 to 3 corresponding to 64K, 128K, 256K, and 512K screens, respectively. Setting the SRCCMP bit selects the source data register as the source input to the comparator. If it is cleared, the pattern data register is used. Setting the SLWRAP register makes the source pointer wrap within the line width for inner loop updates. Setting the SSIGN bit sets the sign used when updating the source address. Setting it causes the source address to be decremented rather than incremented. This bit makes X negative in line-drawing.

The blitter 70 also has several destination control bits. Setting the DWRAP bit causes destination address updates to wrap on a programmable boundary, as opposed to running linearly through memory. Bits DWRAP0 and DWRAP1 control the size of the DWRAP function, which makes the source address pointer wrap vertically, with 0 to 3 corresponding to 64K, 128K, 256K, and 512K screens, respectively. Setting the DSTCMP bit selects the source data register as the source input to the comparator. If it is cleared, the pattern data register is used. Setting the DLWRAP register makes the source pointer wrap within the line width for inner loop updates. Setting the DSIGN bit sets the sign used when updating the source address. Setting it causes the source address to be decremented rather than incremented. This bit makes Y negative in line-drawing.

The blitter 70 also has logic function unit control bits. The logic function unit controls the data that is written in a destination write cycle. The LFU allows any logical combination of the source and destination data. This is achieved by each of the LFU bits LFU0 through LFU3 selecting one of the minterms, with the output being given by the logical OR of the selected terms. A 0 value corresponds to NOT source and NOT destination, 1 corresponds to NOT source and destination, 2 corresponds to source and NOT destination, and 3 corresponds to source and destination. There are, therefore, sixteen possibilities.

The blitter 70 also has several comparator control bits. Setting CMPPLN enables plane mode where the three comparator functions operate on the plane number bits as opposed to the entire pixel. Setting the CMPEQ bit causes the comparator to inhibit an inner loop write, if in plane mode the priority of the destination pixel is equal to the plane priority of the source pixel, or if the entire pixel is the same if not in plane mode. Setting the CMPNE bit causes the comparator to inhibit an inner loop write, if in plane mode the priority of the destination pixel is not equal to the plane priority of the source pixel, or if the entire pixel is not the same if not in plane mode. Setting the CMPGT bit only operates in plane mode, and causes the comparator to inhibit the write if the plane priority of the destination pixel is greater than the plane priority of the source pixel. Setting the CMPBIT gives a bit to byte expansion scheme. It causes the comparator to generate an inhibit by selecting a bit of the source data register using an inner counter, and generating an inhibit if the bit selected is a zero. The selection is given by 8 in the inner counter selecting bit 0, 7 selecting bit 1, 6 bit 2, and so on.

The program address register points to the source of blitting operation commands. Data is read from it sequentially upwards through memory. It must always be even (i.e., blitter operations must lie on word boundaries). Register 0 corresponds to address bits 0 through 15 and register 1 to address bits 16 through 23 and bits 0 through 7.

Some of the above blitter registers are visible in the I/O space of the CPU 30. In addition, some blitter status and control bits are accessible to the CPU 30. As mentioned above, the blitter 70 has 7 word-wide read registers and 4 word-wide write registers. Any unused bits in the write register should be written with a 0. The I/O registers appear starting from I/O address 40H. These registers are also available in the memory map, principally so the DSP 74 can access them, starting at the same offsets as I/O, but at base address F10400H (i.e., subtract 40H and add F10400H to get the memory address). The first blitter destination register corresponds to bits 0 through 15 of the destination address register. Bits 0 through 7 of the second blitter destination register correspond to bits 16 through 23 of the destination address register. And bit 15 of the second blitter destination register corresponds to the destination address nibble part of the destination address register. The first blitter source register corresponds to the bits 0 through 15 of the source address register. Bits 0 through 7 of the second blitter source register correspond to bits 16 through 23 of the source address register and bit 15 of the second blitter source register correspond to the source address nibble part. Bits 0 through 9 of the blitter inner counter correspond to the inner counter value. Bits 0 through 9 of the blitter outer counter correspond to the outer counter value. The blitter status register gives a variety of blitter status information. Bit 0 indicates that the comparator plane priority greater than condition is met. Bit 1 indicates that the comparator plane priority equal condition is met. Bit 2 indicates that the comparator plane priority not equal condition is met. Bit 3 indicates that the comparator pixel equal condition is met. Bit 4 indicates that the comparator pixel not equal condition is met. Bit 5 indicates that the comparator bit to pixel condition is met. Bit 13 corresponds to the run bit stating that the blitter is currently active, or operation is suspended by a CPU interrupt or a collision stop. Bit 14 indicates that the blitter has stopped for a CPU interrupt. Bit 15 indicates that the blitter has stopped because of a collision detection. The blitter program address register is loaded with bits 0 through 15 of the blitter program address. Recall that bit 0 of the register is always 0 because blitter programs must lie on word boundaries. The second blitter program address register is loaded with bits 16 through 23 of the blitter program address in bits 0 through 7. The other 8 bits are 0. The blitter command register corresponds to word 0 of the blitter command, and is used to set up the command when the blitter is started. Blitter DMA will then start from word one of the command.

The blitter control register has three bits: bit 0 which is an interrupt stop mask masks interrupts from the blitter's bus control unit when set, with a result that the blitter will not stop when an interrupt occurs, bit 1 causes the blitter to resume operation after a collision and is used to restart the blitter after a collision has been detected. Recall that a collision is detected when the COLST bit is set. The blitter will resume the operation which it has suspended. Note that it is possible to reprogram the blitter command register while the blitter is in the collision stop state, so the COLST bit among others may be changed, and bit 2 resets the blitter to a quiescent state after collision and is used to abort the operation the blitter was performing when a collision stop has occurred. Note that after a blitter collision stop occurs, either a resume or a reset should be issued to the blitter. The blitter 70 also has three rotate registers. Bits 0 through 3 correspond to the top four bits of the integer part of the X address, the bottom six bits of the 10-bit value are the integer part of the red value. Bits 4 through 7 correspond to the top four bits of the integer part of the X increment, the bottom six bits of this ten-bit value are the integer part are the red integer value. Bits 8 through 11 correspond to the top four bits of the integer part of the X step, the bottom six bits of this ten-bit value are the integer part are the red integer value. With the second rotate register bits 0 through 3 correspond to the top four bits of the integer part of the Y address, the bottom six bits of this ten-bit value are the integer part are the green integer value. Bits 4 through 7 correspond to the top four bits of the integer part of the Y increment, the bottom six bits of the ten-bit value are the integer part of the green integer value. Bits 8 through 11 correspond to the top 4 bits of the integer part of the Y step, the bottom six bits of the ten-bit value are the integer part are the green integer value. In the third rotate register setting bit 0 causes the rotate address to replace the destination. Setting bit 1 causes the rotate address to replace the source address. Setting bit 2 sets rotation mode, as opposed to shading mode. And bits 10 through 15 correspond to the top bits of the rotate address.

The DSP 74 audio coprocessor is a general purpose arithmetic coprocessor with sufficient power to implement a high performance music synthesizer. Synchronous serial outputs are provided for a generation of stereo audio signals with 16 bit precision, giving a sound quality normally associated with compact disc technology. The DSP 74 is micro-programmable from the host CPU 30 and the instruction set is sufficiently flexible to enable the user to program the device to fulfill many different functions that are quite different from that of "music synthesizer." Such applications might include algorithmic speech generation, audio analysis using fast Fourier transform techniques, and three-dimensional graphics rotations. The DSP 74 uses Harvard architecture (separate program and data buses) for maximum data throughput. The DSP 74 has an arithmetic logic unit (ALU).

The ALU features a hardware 16-bit by 16-bit hardware multiply/accumulate as well as addition, subtraction, and logical functions. There is also a separate serial divide unit, which generates one quotient bit per tick. The carry bit from the adder/subtracter is stored in a separate latch and can be either used to propagate carry for multiple precision arithmetic operations or can be used for conditional instructions. All instructions may be made to be dependent on this bit being set. Data transfers within the device are all 16 bits wide, with the exception of internal transactions within the multiplier/accumulator.

The DSP 74 is a very simple, very fast processor intended primarily for sound synthesis, but also capable of other computational tasks as noted above. It executes all instructions in one processor cycle; these instructions are executed at the system clock speed (typically 20 to 33 megahertz). During sound synthesis, the DSP 74 has its timing controlled by timers in an audio digital-to-analog converter (DAC) interface. These DACs are double-buffered, and if a DAC write is about to cause overflow, then operation is suspended until the buffer is empty. So long as the software to executes loops at sample rate, and as long as the average loop time is less than the sample period, then occasional loops can be up to twice as long. Because the loop may contain more instructions than will fit in the program RAM, the DSP 74 has an indexed addressing mode, which allows the same piece of code to act on several voices.

The DSP 74 is a Harvard Architecture device, thus the program RAM and the data RAM are separate, with cycles occurring in both RAM blocks at the same time. A one-cycle pipeline is used; therefore, during each clock cycle two events occur: an instruction is fetched, and the data transfer associated with the previous instruction takes place. This has the odd effect that an instruction after a jump is executed. The DSP 74 has two arithmetic logic units (ALUs, not shown): a typical ALU and a multiply/accumulate ALU. several registers: an X operand register, a second operand register, an AZ register, which holds the result from the ALU, and an MZ register, which holds the result from the multiply/accumulate register. The DSP 74 also has a DMA channel and a divider.

Operation of the DSP 74 is fairly simple. In the first tick of an execution of an instruction, the opcode is read from the program RAM into the instruction decoder. In the second tick, while the next instruction is read from the program RAM, a data transfer is performed either from system memory 34 to a register or a register to system memory 34, as per the first instruction.

The ALU within the DSP 74 is a 16-bit arithmetic logic unit, with the same functions as a Texas Instruments 74181, which is well known in the art. Common arithmetic operations are encoded as instructions; uncommon instructions may be performed by directly setting up the ALU mode bits with the general purpose arithmetic instruction (GAI).

The DSP 74 also has a multiplier/accumulator, which is a second ALU to perform 16 by 16 signed/unsigned multiplies to yield a 32 bit result. In addition to this, it may also perform multiply/accumulate operations, where the product of the multiply is added to the previous result. A result is accumulated to 36 bits to allow for overflow. Multiplier operations actually take two ticks, although the multiplying instruction itself completes in one tick. This means that the instruction following a multiply or a multiply accumulate may not involve the MZ register or the X register.

The DSP 74 also has a divider. The division unit appears as a set of registers in the internal DSP 74 space. It is capable of unsigned division on 16- or 32-bit operands, and produces a quotient and a remainder.

The DSP 74 also has a DMA channel. The DMA channel appears as a set of registers in the DSP 74 data memory space. These are two address registers and a data register. A DMA transfer is initiated by writing an address to the first of the two address registers. DMA transfers have a latency period, which must be allowed to elapse before performing further DMA. The DMA state machine is responsible for requesting the SYSTEM' bus 61, and when it is granted, performing the transfer, after which the SYSTEM' bus 61 is released.

In the alternative, a word may be written to the second of the two address registers with a hold bit set. This will request the SYSTEM' bus 61 and retain it until the hold bit is cleared. Such a DMA transfer may be efficient when performing successive multiple transfers, but is generally less efficient for single transfers because the DSP 74 program cannot determine when the SYSTEM' bus 61 is granted, and therefore has to wait the maximum possible latency. DSP 74 memory is generally visible in both the DSP's internal data address base and in the host address base.

The DSP 74 has a DSP memory 76 associated with it. The DSP memory 76 comprises program RAM, data RAM, a register/constant table, and a sine ROM (all not shown). The DSP memory 76 in general is accessible in both the DSP's internal address space as well as the address space of the system memory 34. The DSP program RAM is 512 18-bit words. These locations may only be written by the CPU 30, and are program read-only as far as the DSP 74 is concerned. Program RAM does not appear in the DSP internal address space. The program RAM is not accessible to the host when the DSP 74 is running. Each DSP instruction has a 7-bit opcode and an 11-bit address vector. All microcoded instructions (with the exception of multiply or multiply/accumulate operations) are completed in 185 nanosecond cycle. All instructions are system memory 34 to register transfers or register to register transfers; immediate values are not allowed. Thus, if a constant is needed for a given instruction, it is not available in the constant table, a data RAM location must be set aside for the value. The DSP 74 also allows conditional instructions and indexed addressing. If bit 12 of the instruction code is set, then the instruction is executed only if the carry bit in the ALU is also set. If bit 11 in the instruction code is set, then the 9-bit address vector in the instruction code is added to the 9-bit value in the index register to produce the address and data memory operated on by the instruction. The extra two bits are programmed by loading the values into an extra bits register then writing the word into the desired location.

The DSP 74 has numerous move commands, which move data from and to memory and registers. Several other commands are available, including adding, subtracting, ANDing, ORing, adding with carry, a NOP, the GAI described above, and an INTRUDE command, which allows the DSP memory 76 to be accessed by the CPU 30.

The sine ROM is 256 16-bit words of full sine wave two's complement sine wave values.

The data RAM is 512 16-bit words.

Data may be transferred between the CPU 30 and the DSP 74 either under control of the DSP 74 or under the control of the host CPU 30.

The DMA transfer mechanism is based upon the DSP 74 becoming the bus master on the SYSTEM' bus 61 and accessing the system memory 34. The DSP 74 is one of the highest priority bus masters, and will therefore be granted the SYSTEM' bus 61 by the current bus master as soon as the current bus master is able to give up the SYSTEM' bus 61. The worst case for giving up the SYSTEM' bus 61 is the situation where the CPU 30 is the bus master, because the 80376 or 80386SX processor can take a considerable amount of time to release the SYSTEM' bus 61. DMA transfers are started by a write to the first DMA address register, as stated above. Transfer of status information and the high part of the address should already have been written to the second DMA address register; similarly write data should already have been written to the DMA data register in the case of write transfers. When a transfer is initiated, the DSP 74 requests the SYSTEM' bus 61 and when the SYSTEM' bus 61 is granted to the DSP 74, the DSP 74 performs the transfer and then releases the SYSTEM' bus 61. Completion of this operation may be polled or the programmer may choose to allow the maximum possible latency to elapse before using read data and/or initiating another transfer.

A second bus acquisition technique may be performed which uses the hold bit in the second of the two DMA address registers to request the SYSTEM' bus 61. This may be more efficient if the DSP 74 wishes to perform multiple transfers consecutively, because the SYSTEM' bus 61 is not released between transfers. The hold bit in the second DMA address register must be cleared before the DSP 74 will release the SYSTEM' bus 61. This mechanism is generally not recommended because the DSP 74 will have control of the SYSTEM' bus 61 for significant periods of time without any activity, which is wasteful of overall memory bus bandwidth and could potentially disturb CD DMA transfers. If using the second technique, the DSP 74 must first request the SYSTEM' bus 61 before performing any DMA transfer. It has no means of detecting that it has gained the SYSTEM' bus 61, and must therefore wait the maximum number of bus instructions. Once the DSP 74 has acquired ownership of the SYSTEM' bus 61 it may then proceed to perform bus cycles. It may perform an arbitrary sequence of read and/or write cycles and should relinquish control of the SYSTEM' bus 61 at the end of these.

Data transfer may also be performed between the CPU 30 and the DSP 74 under host CPU 30 control. All the internal memory of the DSP 74 is mapped into the host address space. When the DSP 74 is in stop mode, the host may write program memory locations just as if they were in normal system memory 34. When the DSP 74 is running, however, the program memory is not available to the host. DSP 74 data memory is only available by the INTRUDE mechanism. To ensure that DSP 74 operations are not disturbed in any way, data transactions can only take place in the data when the DSP 74 is executing INTRUDE instructions. When the DSP 74 is stopped, it may be considered to be effectively executing INTRUDE instructions constantly.

CPU 30 to DSP program RAM 76 transfers may be performed using the blitter 70 only while the DSP 74 is not running. Likewise, the blitter 70 cannot access DSP data RAM while the DSP 74 is executing. In short, both the blitter 70 and the CPU 30 may modify DSP program RAM 76 only while the DSP 74 executes an INTRUDE instruction.

The DSP 74 can cause the blitter 70 to perform very fast block moves of DSP code from system RAM to DSP program RAM. Thus, the DSP 74 and blitter 70 can team up to effectively provide the DSP 74 with more program RAM than is actually available.

The DSP 74 also has a serial audio digital-to-analog convertor (DAC) interface. The serial DAC interface allows the DSP 74 to both drive a synchronous serial ($I^2S$ or similar) DAC, and to input data from a synchronous serial data source such as a CD drive. The interface timing can be internally generated if no input device is attached, but if a data source is present, then it must be used to determine the timing. An internal overflow detector prevents the DSP 74 from writing to the DAC before the previous output data has been fully output. This is governed by write to the first of two DAC registers. Therefore, DAC transfers should take the form: write to the first DAC register, write to the second DAC register, read input values. These should be performed in close succession (less than 16 instructions). There is no detection of underflow, and should this occur, then the previous output value will be output again. The DAC values are doubled buffered, so that although audio code should loop at an average rate less than or equal to the sample period, it is possible for occasional passes through the loop to take up to two sample periods. This may be useful for exception processing.

The DSP 74 contains an arithmetic logic unit (ALU) compatible with the Texas Instruments 74181 device.

The A/V/CD controller/coprocessor 32 also has a compact disc DMA controller. This CD controller contains the following functional blocks: A simple synchronous serial interface (for $I^2S$ and similar) a CD ROM block decoder and a DMA channel. The mechanism allows a serial data stream to be transferred to system memory 34, either directly, or by first passing through a block decoder. This allows an external block decoder to be used, in case of problems or incapabilities in the internal one. An interrupt can be generated when a transfer completes, given the transfer length counter reaching zero.

The compact disc controller synchronous serial interface supports the Philips data format, which is well known in the art. The Philips data format has a clock, a word select, line and a data line. The word select leads the data by one tick of the clock, and the data is aligned against the most significant bit (MSB) of a 32-bit datum. A low on the word select line indicates left data and a high on the word select line indicates right data. The synchronous serial interface also supports the Philips block decoder output formula. The bit ordering is reversed, and the first bit is aligned against the first bit of the datum. The word select format can be either the Philips data format, the Sony data format, or the Matsushita data format.

The CD drive controller 72 also has a block decoder. The block decoder synchronizes to the start of the 2352-byte sectors, performs the descrambling, and computes the EDC (error detection code) to detect errors. It operates in either short mode where a 2048 data bytes are transferred after the header, or a long mode, where the 2340 bytes after the sync pattern are transferred. This allows the header and error correction data to be read if desired. The header size is either programmable to either 4 or 12 bytes to support CD drive mode 1 and CDI/XA mode 2 form 1, but header matching is only performed on the main 4-byte header. The mode 2 forms are only supported by operating in long mode and extracting the required data. Header matching is performed on the first sector of the transfer to ensure that the correct data is being read. The desired header value should be programmed into the header registers. If a multisector transfer is performed, then no further matching occurs after the first sector.

Typically, normal transfers are performed in short mode, with the long mode being used when an error has been detected, so that the operating software can attempt to correct it. Multiple sector transfers are supported by giving a count of the total number of long words to be transferred. Errors will abort multiple sector transfers. Errors can take the following forms: unreliable data, EDC error, and no sync. It is possible to poll the decoder to determine its current status. The CD drive controller also has a DMA interface. The DMA interface can transfer to 2 16-bit words at a time into system memory 34. It can take either the output from the internal block decoder or the output from the synchronous serial interface. It has an address counter that runs upwards through system memory 34. The DMA interface has a transfer length counter for direct transfer from the serial interface. In "forever mode" the DMA address register wraps within a 32 kilobyte buffer, and a counter is ignored. This may be useful for CD audio data, or for real time and data handling such as "full-motion video" decompression. A CPU 30 interrupt is generated every time the address pointer wraps around the buffer.

Figure 5:
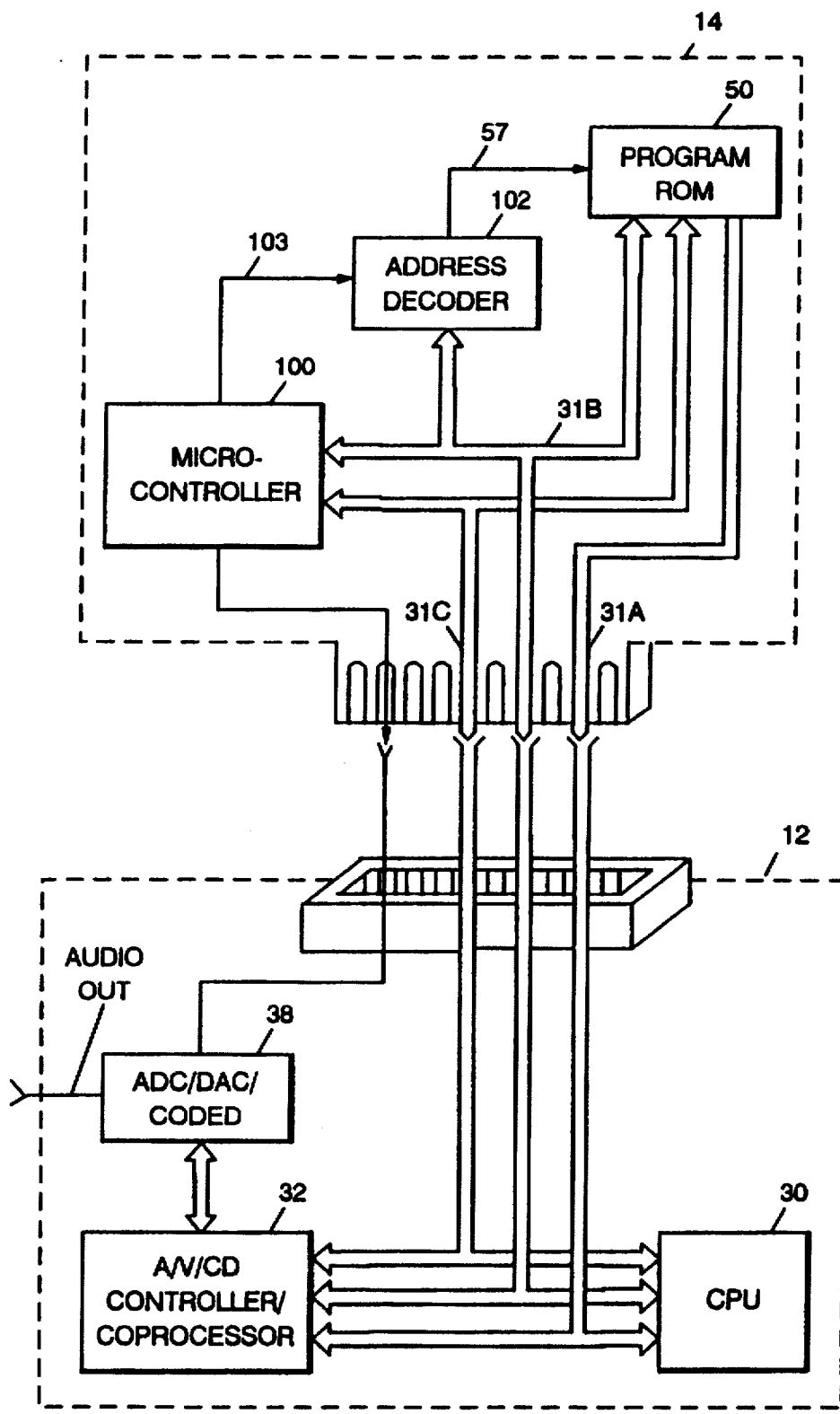
FIG. 5 is a block diagram showing an alternate circuit for "locking" a program cartridge.

Referring now to FIG. 5, an alternative way of "locking" a cartridge is shown. As stated above, the address scrambler 54 of FIGS. 1A and 3 provides one way of "locking" program cartridges 14 against unauthorized use. Another method is to place a tone-generating microcontroller 100 into the cartridge as shown in FIG. 5. The cartridge contains a program ROM 50, which is described above in the text accompanying FIG. 1A, an address decoder 102, described in general in the text describing the address scrambler 54, and the microcontroller 100.

The address decoder is very similar to the address decoders found in typical cartridges, with the addition that the address decoder 102 generates a chip select 57 signal to the program ROM 50 only when the microcontroller 100 enables the address decoder 102 via an enable line 103. The microcontroller 100 "locks" the cartridge 14 by disabling the address decoder 102.

The microcontroller 100 is in electrical circuit communication with the CPU 30 and the address decoder 102, as shown in FIG. 5. When the system resets, the microcontroller 100 disables the address decoder 102, thereby "locking" the cartridge. The microcontroller 100 monitors the ADDRESS bus 31b or another bus for an address or sequence of addresses. When the microcontroller 100 detects the proper sequence of addresses, it enables the address decoder 102, thereby "unlocking" the cartridge.

The microcontroller 100 acknowledges the proper sequence of addresses by generating a sequence of musical notes, which is heard by the user and detected by the CPU 30. Any attempted key causes a tone to be produced by the microcontroller 100. The system unit can detect the tones in any of several ways: discrete tone detection circuits (like a DTMF tone decoder used in typical telephone circuits) can be used to detect the tones or the tone can be digitized with an A/D converter and analyzed with an FFT algorithm to detect the generated tone signature. In the latter case, the DSP 74 performs the analysis and communicates to the CPU 30 that the proper tone or set of tones was played, indicating that the cartridge is now unlocked.

Figure 6:
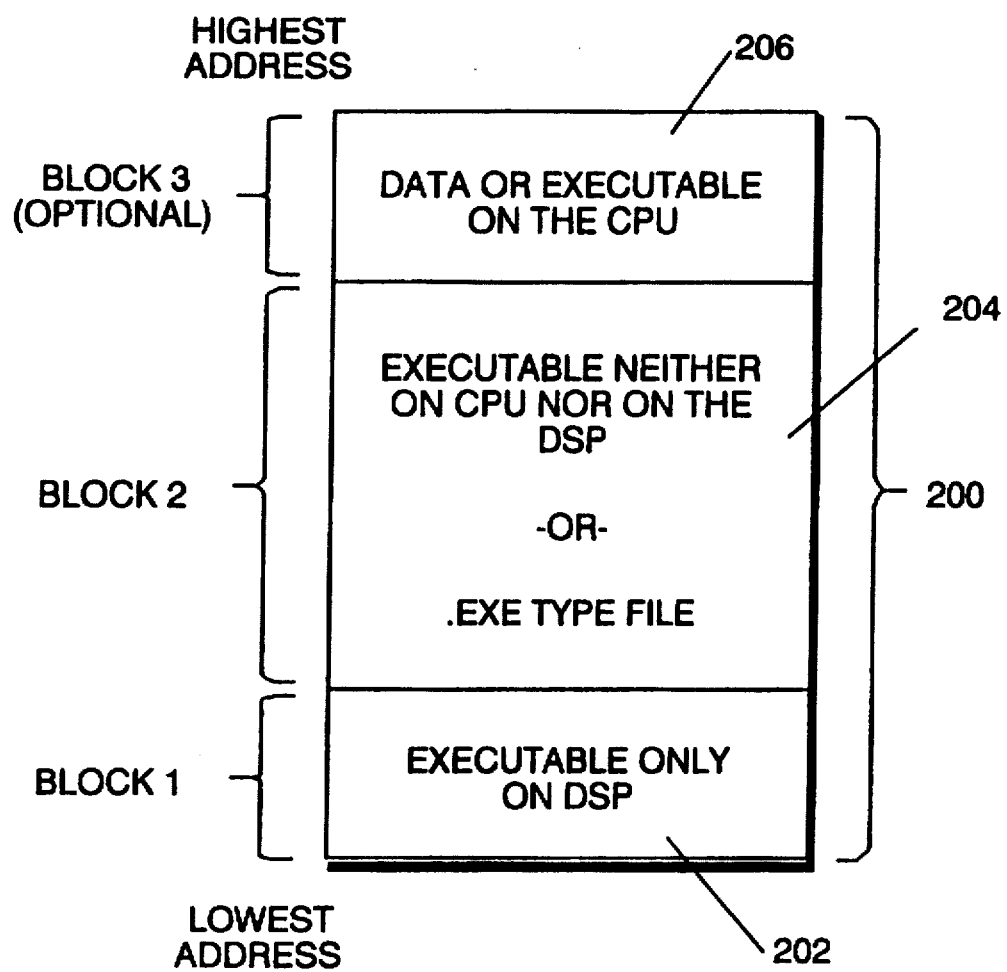
FIG. 6 shows a memory map of a third alternative for "locking" a program cartridge.

Referring now to FIG. 6, a third alternative for "locking" a cartridge is shown. The address scrambler 54 of FIGS. 1A and 3 and microcontroller 100 of FIG. 5 provide two different ways of "locking" memory devices using hardware manipulation of address and data lines. However, not all memory devices are interfaced to systems in such a way as to make protection of individual programs feasible with hardware. For example, some storage devices have a removable memory medium. Thus, a different type of method is required to "lock" memory devices without address and data lines, such as a preprogrammed flexible diskette or a preprogrammed CD drive diskette. Such devices do not have address or data lines; therefore, they cannot be locked with an address scrambler or a selective locked chip select.

One technique of locking such devices is to make use of the fact that the system 10 of the present invention has both a CPU 30 and a DSP 74 that have incompatible opcodes. That is, code compiled to execute on the CPU 30 will not directly execute on the DSP 74, and vice versa.

A locking device making use of the incompatible opcodes is shown in FIG. 6. FIG. 6 shows a memory map 200 of a program ROM containing at least two blocks of data: (1) a block of executable code capable of being executed on the DSP 74 but not on the CPU 30 (BLOCK1 202 in FIG. 6) and (2) a block of code that is capable of executing on the CPU 30 that is compressed or scrambled such that it cannot be executed on either the CPU 30 without first being decompressed or descrambled (BLOCK2 204 in FIG. 6). The two blocks of code can be placed into virtually any type of memory devices: program cartridges 14, or preprogrammed flexible diskettes, or preprogrammed CD drive diskettes, for example.

The first block of code BLOCK1 202 is a small block of code executable on the DSP 74. It is a small program serving only four functions: (1) validating the presence of a memory device, (2) loading the second block of data from the memory device into system RAM 34, (3) decompressing or descrambling the second block of memory BLOCK2 204 into a form executable by the CPU 30, and (4) causing the CPU to execute that executable code. Steps (2) and (3) can be performed in parallel by reading a small section of data, decompressing or descrambling it, and writing the resultant code to memory.

The second block of code BLOCK2 204 is a larger block of application code capable of execution in the CPU 30, except that the code has been compressed or scrambled. Thus, as loaded into the second block BLOCK2 204, the data cannot be executed by either the DSP 74 or the CPU 30. Placing the executable code into the well known run-length encoding (RLE) format is one method of compressing and scrambling the data in the second block of code BLOCK2 204. A way of merely scrambling the second block is to perform the well known picket fence cipher to the data, thereby swapping bytes of data in such a way that they may be deciphered. Scrambling data could be as simple as swapping the upper and lower nibbles of a byte or as complicated as using any of the well known encryption methods to make the code unreadable when accessed in the normal sequential fashion. This is different than scrambling the address lines, as described in the text above, to make a normal sequential code fetch break because an instruction is more than one byte long.

The entire second block of code BLOCK2 204 need not be compressed or scrambled; enough code must be compressed or scrambled to prevent the application from being executed by unauthorized devices. The remaining uncompressed and unscrambled data may be placed in optional BLOCK3 206. For example, graphical data need not be compressed. As another example, all subroutines need not be compressed if the high-level program executive is completely scrambled.

The system of FIGS. 1A and 1B is capable of unlocking the three block cartridge described above. However, a system with a compatible CPU but without a compatible DSP is incapable of executing the application, because the CPU is unable to execute either block of code on the memory device: the first block BLOCK1 202 has opcodes that are totally incompatible with the CPU 30 and the second block BLOCK2 204 has been compressed or scrambled rendering it non-executable. Thus, the memory device is "locked."

The memory device is "unlocked" by the system of FIGS. 1A and 1B as follows. First, the CPU 30 initializes the system 10 and checks for the presence of a memory device, such as a CD drive 22. If a memory device is detected the CPU 30 loads the first block BLOCK1 202 from the memory device to system RAM 34. The CPU 30 then causes the DSP 74 to execute the code transferred from the memory device to system RAM 34. Executing the first block of code BLOCK1 202 causes the DSP 74 to ensure that a memory device is present by, for example, performing a checksum on the device, copy the second block of memory BLOCK2 204 from the memory device to the system RAM 34, and decompress or descramble the second block of data BLOCK2 204 into a form executable on the CPU 30. Finally, the DSP 74 causes the CPU to execute the executable code transformed from the second block of data BLOCK2 204, thereby causing the application to start.

The advantage of this method is that no additional hardware is required in the memory device; one merely must put the first and second blocks of data into the memory device, as explained above. Thus, this two-block method is suitable for program cartridges 14 as well as preprogrammed flexible diskettes and CD drive diskettes.

In the alternative, BLOCK2 204 might be executable, but in a form that must be loaded in a particular fashion. An example of such a form is an executable file in the well known EXE form. Such a block of data is executable, but only when the executable portion is properly loaded into memory. Implementing the lock entails placing a loader program into BLOCK1 202, executable only on the DSP 74. The loader program accesses BLOCK2 204, loads it into memory 34, locates the executable portion, and passes control to the CPU 30.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. For example, the address scrambler 54 of FIG. 3 can be combined with the two-block locking method discussed above. In addition, the lock control circuit 56 of FIG. 1A can be combined with the generic address decoder 102 of FIG. 5 without the need for the tone-producing microcontroller 100. Therefore, the invention in its broader aspects is not limited to the specific details, representative apparatus and method, and illustrative examples shown and described. Accordingly, departures may be made from such details without departing from the spirit or scope of the applicant's general inventive concept.

I claim:

1. A method of ensuring that a memory cartridge having a readable memory is authorized for use in a computer system having a central processing unit (CPU) in circuit communication with the readable memory via at least one bus having at least one bus line, said method comprising the steps of:
   (a) scrambling said at least one bus line of said at least one bus to thereby create a scrambled bus;
   (b) asserting an address on said scrambled bus;
   (c) reading data associated with said asserted address on said scrambled bus;
   (d) detecting a preselected set of events; wherein said step of detecting includes the step of detecting a sequence of addresses asserted on said scrambled bus;
   (e) unscrambling said at least one bus line of said at least one bus responsive to said detection of a preselected set of events to thereby create an unscrambled bus;
   (f) asserting said address on said unscrambled bus;
   (g) reading data associated with said asserted address on said unscrambled bus; and
   (h) comparing said data associated with said asserted address on said scrambled bus to said data associated with said asserted address on said unscrambled bus.

2. The method of claim 1 where said step of detecting a preselected set of events includes the detection of at least one bus value asserted on said at least one bus.

3. The method of claim 1 wherein the step of scrambling said at least one bus line includes the step of switching said at least one bus line with a second bus line.

4. The method of claim 1 wherein the step of scrambling said at least one bus line includes the step of placing said address asserted on said at least one bus line on a plurality of bus lines.

5. The method of claim 1 wherein the step of scrambling said at least one bus line includes the step of randomly placing said address asserted on said at least one bus line on a plurality of bus lines.

6. An authentication system for determining whether a memory cartridge is authorized for use in a computer system, the authentication system comprising:
   (a) a central processing unit (CPU) having at least one bus associated therewith, and wherein said at least one bus includes at least one bus line;
   (b) an addressable memory cartridge in removable circuit communication with said CPU and having:
      (1) a readable memory in circuit communication with said CPU;
      (2) a bus line scrambler in circuit communication with said CPU and with said memory, interposed between said CPU and said memory along said one bus; and (3) a lock control circuit in circuit communication with said CPU and said bus line scrambler;

(c) logic for comparing data associated with a scrambled address to data associated with an unscrambled address;

(d) logic for asserting an unscramble sequence code to said lock control circuit wherein said unscramble sequence code comprises a plurality of addresses having a predetermined order;

said lock control circuit configured such that said lock control circuit causes said bus line scrambler to scramble said at least one bus line of said at least one bus responsive to an occurrence of a first set of preselected events; and said lock control circuit further configured such that said lock control circuit causes said bus line scrambler to cease scrambling said at least one bus line responsive to an occurrence of a second set of preselected events.

7. The bus line scrambler of claim 6 comprising logic for switching said at least one bus line with a second bus line.

8. The bus line scrambler of claim 6 comprising logic for placing an address asserted on said at least one bus line on a plurality of bus lines.

9. The bus line scrambler of claim 6 comprising logic for randomly placing an address asserted on said at least one bus line on a plurality of bus lines.

10. The bus line scrambler of claim 6 comprising a multiplexer.

11. The lock control circuit of claim 6 comprising a state machine having at least a lock state and an unlock state.

12. A system for authentication of a memory device, wherein the system comprises a CPU for executing instructions, at least one bus in circuit communication with said CPU and for transferring information to and from the CPU and an addressable memory cartridge in circuit communication with said CPU, said addressable memory cartridge comprising:

(a) a readable memory in circuit communication with said CPU;

(b) a bus line scrambler in circuit communication with said CPU and with said memory, interposed between said CPU and said memory along said one bus; and (c) a lock control circuit in circuit communication with said CPU and said bus line scrambler; said lock control circuit comprising:

(1) an address input for inputting a memory address into said lock control circuit;

(2) logic for detecting a preselected set of events in circuit communication with said address input;

(3) a scramble/unscramble output in circuit communication with said bus line scrambler and for controlling said bus line scrambler; said scramble/unscramble output having a scramble state and an unscramble state; and (4) a state machine for determining said state of said scramble/unscramble output; said state machine responsive to said memory address input; said state machine comprising:

(i) a locked state for causing said scramble/unscramble output to be in said scrambled state;

(ii) an intermediate locked state for causing said scramble/unscramble output to be in said scrambled state; and (iii) an unlocked state for causing said scramble/unscramble output to be in said unscrambled state; and wherein said system further comprises logic for comparing data in said scrambled state to data in said unscrambled state.

13. The system or method of claim 1, 6, or 12 wherein one of said preselected events comprises a system power up.

14. The system or method of claim 1, 6, or 12 wherein one of said preselected events comprises a system reset.

15. The system or method of claim 1, 6 or 12 wherein one of said preselected set of events comprises at least one bus value asserted on said at least one bus.

16. The system of claim 6 or 12 further comprising:

(a) an audio/video/CD drive controller/coprocessor in circuit communication with said CPU via said at least one bus; and (b) a system memory in circuit communication with said audio/video/CD drive controller/coprocessor via a second bus;

(c) said audio/video/CD drive controller/coprocessor including an arbitrator for arbitrating control over said system bus, a memory interface, a graphics coprocessor, a digital signal processor, a compact disk controller, and a video controller all in circuit communication with said CPU and said system memory and each configured such that any one of said CPU, said graphics coprocessor, said digital signal processor, said compact disk controller, and said video controller may become bus master of said second bus.

17. The system of claim 6 or 12 further comprising:

(a) an audio/video/CD drive controller/coprocessor in circuit communication with said CPU via said at least one bus;

(b) a system memory in circuit communication with said audio/video/CD drive controller/coprocessor via a second system bus;

(c) said audio/video/CD drive controller/coprocessor including an arbitrator for arbitrating control over said second bus, a memory interface, a graphics coprocessor, a digital signal processor, a compact disk controller, and a video controller all in circuit communication with said CPU and said system memory and each configured such that any one of said CPU, said graphics coprocessor, said digital signal processor, said compact disk controller, and said video controller may become bus master of said second bus; and (d) further comprising an interrupt controller for interfacing interrupts to said CPU and said arbitrator responsive to said interrupt controller such that said CPU does not have the highest priority for control over said second system bus until an interrupt occurs and is detected by said interrupt controller.

* * * * *